US011671355B2

(12) United States Patent
Baker et al.

(10) Patent No.: US 11,671,355 B2
(45) Date of Patent: Jun. 6, 2023

(54) PACKET FLOW CONTROL IN A HEADER OF A PACKET

(71) Applicant: Oracle International Corporation, Redwood Shores, CA (US)

(72) Inventors: Shane Baker, Kenmore, WA (US); Santosh Narayan Shilimkar, San Jose, CA (US); Jagwinder Singh Brar, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 183 days.

(21) Appl. No.: 17/168,888

(22) Filed: Feb. 5, 2021

(65) Prior Publication Data
US 2022/0255854 A1 Aug. 11, 2022

(51) Int. Cl.
*H04L 45/00* (2022.01)
*H04L 45/74* (2022.01)
*H04L 45/586* (2022.01)
*H04L 45/302* (2022.01)

(52) U.S. Cl.
CPC ............ *H04L 45/38* (2013.01); *H04L 45/302* (2013.01); *H04L 45/566* (2013.01); *H04L 45/586* (2013.01); *H04L 45/74* (2013.01)

(58) Field of Classification Search
CPC ..... H04L 45/38; H04L 45/308; H04L 45/566; H04L 45/586; H04L 45/74
USPC ........................................................ 709/238
See application file for complete search history.

(56) References Cited

U.S. PATENT DOCUMENTS

| 6,628,624 | B1 | 9/2003 | Mahajan et al. |
| 6,801,506 | B1 | 10/2004 | Dey |
| 6,857,027 | B1 | 2/2005 | Lindeborg et al. |
| 6,987,740 | B1 | 1/2006 | Di Benedetto et al. |
| 7,061,875 | B1 | 6/2006 | Portolani et al. |
| 7,127,523 | B2 | 10/2006 | Kotser |

(Continued)

FOREIGN PATENT DOCUMENTS

| CA | 2991359 A1 | 5/2018 |
| CN | 100525312 C | 8/2009 |

(Continued)

OTHER PUBLICATIONS

"Configuring Local Span, Rspan and Erspan", Cisco IOS Software Configuration Guide, Release 12.2SX, Chapter 68, Aug. 17, 2007, 36 pages.

(Continued)

*Primary Examiner* — Hermon Asres
(74) *Attorney, Agent, or Firm* — Kilpatrick Townsend & Stockton LLP

(57) ABSTRACT

Techniques for controlling packet flows are described. In an example, a packet is sent on a virtual network. The packet's header includes scoping data that indicates a network boundary within which the packet is permitted and/or prohibited to flow. A network virtualization device of a substrate network receives the packet. The network virtualization device determines the scoping data from the header and, based on network configuration information, determines the forward flow of the packet. If the forward flow falls within a permitted network boundary indicated by the scoping data, the network virtualization device sends the packet forward. Otherwise, the packet is dropped.

20 Claims, 21 Drawing Sheets

(56) References Cited

U.S. PATENT DOCUMENTS

| | | |
|---|---|---|
| 7,177,946 B1 | 2/2007 | Kaluve et al. |
| 7,463,597 B1 | 12/2008 | Kompella |
| 7,478,173 B1 | 1/2009 | Delco |
| 7,480,258 B1 | 1/2009 | Shuen et al. |
| 7,596,101 B2 | 9/2009 | Oguchi |
| 7,606,177 B1 | 10/2009 | Mahajan et al. |
| 7,729,296 B1 | 6/2010 | Choudhary |
| 7,746,783 B1 | 6/2010 | Tripathi et al. |
| 7,792,056 B2 | 9/2010 | Sullivan et al. |
| 7,801,061 B2 | 9/2010 | Khan et al. |
| 8,441,942 B1 | 5/2013 | Guha et al. |
| 8,892,724 B1 | 11/2014 | Bertz et al. |
| 8,918,608 B2 | 12/2014 | Shatz |
| 9,154,327 B1 | 10/2015 | Marino et al. |
| 9,176,763 B2 | 11/2015 | Eidus et al. |
| 9,306,832 B2 | 4/2016 | Fishman et al. |
| 9,419,937 B2 | 8/2016 | Bhagwat et al. |
| 9,432,250 B2 | 8/2016 | Ma et al. |
| 9,477,505 B2 | 10/2016 | Eidus et al. |
| 9,647,902 B2 | 5/2017 | Fishman et al. |
| 9,648,121 B2 | 5/2017 | Figovsky et al. |
| 9,652,274 B2 | 5/2017 | Shatz |
| 9,866,525 B2 | 1/2018 | Figovsky et al. |
| 9,946,870 B2 | 4/2018 | Eidus et al. |
| 10,009,371 B2 | 6/2018 | Antony |
| 10,178,073 B2 | 1/2019 | Shaposhnik |
| 10,374,956 B1 | 8/2019 | Tracy et al. |
| 10,484,331 B1 | 11/2019 | Rossman |
| 10,623,433 B1 | 4/2020 | Veselov et al. |
| 10,708,082 B1 | 7/2020 | Bakiaraj et al. |
| 10,778,465 B1 | 9/2020 | Borle |
| 10,834,044 B2 | 11/2020 | Tillotson et al. |
| 10,931,478 B2 | 2/2021 | Nunes et al. |
| 11,159,366 B1 | 10/2021 | Gawade et al. |
| 11,171,834 B1 | 11/2021 | Bockelmann et al. |
| 11,316,822 B1 | 4/2022 | Gawade et al. |
| 11,463,355 B2 | 10/2022 | Kreger-Stickles et al. |
| 2002/0120769 A1 | 8/2002 | Ammitzboell |
| 2003/0225908 A1 | 12/2003 | Srinivasan et al. |
| 2004/0190454 A1 | 9/2004 | Higasiyama |
| 2004/0210623 A1 | 10/2004 | Hydrie et al. |
| 2005/0013260 A1 | 1/2005 | Ramanathan et al. |
| 2005/0169239 A1 | 8/2005 | Knees et al. |
| 2005/0220036 A1 | 10/2005 | Sugitani et al. |
| 2005/0222815 A1 | 10/2005 | Tolly |
| 2006/0045089 A1 | 3/2006 | Bacher et al. |
| 2006/0133287 A1 | 6/2006 | Nishi |
| 2007/0008964 A1 | 1/2007 | Rose et al. |
| 2007/0025275 A1 | 2/2007 | Tallet et al. |
| 2007/0094411 A1 | 4/2007 | Mullane et al. |
| 2007/0121672 A1 | 5/2007 | Kang |
| 2007/0159987 A1 | 7/2007 | Khan et al. |
| 2008/0101219 A1 | 5/2008 | Rose et al. |
| 2008/0123561 A1 | 5/2008 | Sharma et al. |
| 2008/0165705 A1 | 7/2008 | Umayabashi et al. |
| 2008/0205387 A1 | 8/2008 | Wakumoto |
| 2008/0205402 A1 | 8/2008 | McGee et al. |
| 2008/0279203 A1 | 11/2008 | Ramalho Ribeiro dos Santos et al. |
| 2008/0291822 A1 | 11/2008 | Farkas et al. |
| 2008/0316917 A1 | 12/2008 | Farkas et al. |
| 2009/0063706 A1 | 3/2009 | Goldman et al. |
| 2009/0109972 A1 | 4/2009 | Chen |
| 2009/0154694 A1 | 6/2009 | Yamauchi et al. |
| 2009/0164522 A1 | 6/2009 | Fahey |
| 2009/0175203 A1 | 7/2009 | Tabery et al. |
| 2009/0180489 A1 | 7/2009 | Fujita et al. |
| 2009/0185571 A1 | 7/2009 | Tallet |
| 2009/0219817 A1 | 9/2009 | Carley |
| 2009/0219836 A1 | 9/2009 | Khan et al. |
| 2009/0274153 A1 | 11/2009 | Kuo et al. |
| 2009/0316584 A1 | 12/2009 | Tanaka et al. |
| 2009/0327462 A1 | 12/2009 | Adams et al. |
| 2010/0002577 A1 | 1/2010 | Moreno et al. |
| 2010/0014526 A1 | 1/2010 | Chavan et al. |
| 2010/0110880 A1 | 5/2010 | Kulkarni et al. |
| 2010/0232322 A1 | 9/2010 | Umayabashi et al. |
| 2011/0064002 A1 | 3/2011 | Khan et al. |
| 2011/0090910 A1 | 4/2011 | Tripathi et al. |
| 2011/0158248 A1 | 6/2011 | Vorunganti et al. |
| 2011/0249551 A1 | 10/2011 | Rollins |
| 2011/0273984 A1* | 11/2011 | Hsu ................ H04L 47/824 370/235 |
| 2011/0280159 A1 | 11/2011 | Miller |
| 2011/0283017 A1 | 11/2011 | Alkhatib et al. |
| 2011/0317703 A1 | 12/2011 | Dunbar et al. |
| 2012/0044837 A1 | 2/2012 | Ibanez Fernandez et al. |
| 2012/0051266 A1 | 3/2012 | Lindstrom et al. |
| 2012/0110055 A1 | 5/2012 | Van Biljon et al. |
| 2012/0110056 A1 | 5/2012 | Van Biljon et al. |
| 2012/0110180 A1 | 5/2012 | Van Biljon et al. |
| 2012/0110188 A1 | 5/2012 | Van Biljon et al. |
| 2012/0110636 A1 | 5/2012 | Van Biljon et al. |
| 2012/0110650 A1 | 5/2012 | Van Biljon et al. |
| 2012/0110651 A1 | 5/2012 | Van Biljon et al. |
| 2012/0117229 A1 | 5/2012 | Van Biljon et al. |
| 2012/0201539 A1 | 8/2012 | Boertjes et al. |
| 2012/0210319 A1 | 8/2012 | Recio et al. |
| 2012/0216194 A1 | 8/2012 | Hadas et al. |
| 2012/0250695 A1 | 10/2012 | Jia et al. |
| 2012/0307684 A1 | 12/2012 | Biswas et al. |
| 2012/0324442 A1 | 12/2012 | Barde |
| 2013/0031233 A1 | 1/2013 | Feng et al. |
| 2013/0044631 A1 | 2/2013 | Biswas et al. |
| 2013/0061047 A1 | 3/2013 | Sridharan et al. |
| 2013/0083647 A1 | 4/2013 | Xie |
| 2013/0114400 A1 | 5/2013 | Zhang et al. |
| 2013/0227108 A1* | 8/2013 | Dunbar ............ H04L 12/462 709/223 |
| 2013/0286832 A1 | 10/2013 | Rajah et al. |
| 2013/0301553 A1 | 11/2013 | Klein |
| 2013/0315580 A1 | 11/2013 | Boertjes et al. |
| 2014/0003442 A1 | 1/2014 | Hernandez et al. |
| 2014/0092725 A1 | 4/2014 | Lindstrom |
| 2014/0126418 A1 | 5/2014 | Brendel et al. |
| 2014/0153445 A1 | 6/2014 | Huang |
| 2014/0185616 A1 | 7/2014 | Bloch et al. |
| 2014/0189075 A1 | 7/2014 | Stansell et al. |
| 2014/0233370 A1 | 8/2014 | Khare et al. |
| 2014/0247754 A1 | 9/2014 | Venkata et al. |
| 2014/0310390 A1* | 10/2014 | Sorenson, III ......... H04L 47/10 709/223 |
| 2014/0328340 A1 | 11/2014 | DeCusatis et al. |
| 2014/0376550 A1 | 12/2014 | Khan et al. |
| 2015/0043576 A1 | 2/2015 | Dixon et al. |
| 2015/0058463 A1 | 2/2015 | Wang et al. |
| 2015/0058968 A1 | 2/2015 | Wang et al. |
| 2015/0071110 A1 | 3/2015 | Kothari et al. |
| 2015/0074661 A1 | 3/2015 | Kothari et al. |
| 2015/0082301 A1 | 3/2015 | Garg et al. |
| 2015/0103842 A1 | 4/2015 | Chandrashekhar et al. |
| 2015/0124643 A1 | 5/2015 | Pani et al. |
| 2015/0124814 A1 | 5/2015 | De Silva et al. |
| 2015/0200808 A1 | 7/2015 | Gourlay et al. |
| 2015/0264121 A1 | 9/2015 | Van Biljon et al. |
| 2015/0312049 A1 | 10/2015 | Duda |
| 2015/0365281 A1 | 12/2015 | Marino et al. |
| 2016/0087885 A1 | 3/2016 | Tripathi et al. |
| 2016/0094650 A1 | 3/2016 | Garcia de Rio |
| 2016/0105393 A1 | 4/2016 | Thakkar et al. |
| 2016/0105471 A1 | 4/2016 | Nunes et al. |
| 2016/0173296 A1 | 6/2016 | Ooi |
| 2016/0182336 A1 | 6/2016 | Doctor et al. |
| 2016/0218972 A1 | 7/2016 | Sun |
| 2016/0224363 A1 | 8/2016 | Joy |
| 2016/0274967 A1 | 9/2016 | Umbehocker et al. |
| 2016/0323121 A1 | 11/2016 | Benny et al. |
| 2016/0352624 A1 | 12/2016 | Mishra et al. |
| 2016/0359731 A1 | 12/2016 | Kaku |
| 2017/0085667 A1 | 3/2017 | Flack et al. |
| 2017/0126726 A1 | 5/2017 | Han |
| 2017/0324826 A1 | 11/2017 | Johnsen et al. |
| 2017/0364973 A1 | 12/2017 | Van Biljon et al. |
| 2018/0006923 A1 | 1/2018 | Gao et al. |

(56) References Cited

U.S. PATENT DOCUMENTS

| | | |
|---|---|---|
| 2018/0019956 A1 | 1/2018 | Ravindran et al. |
| 2018/0026872 A1 | 1/2018 | Manthiramoorthy et al. |
| 2018/0041477 A1 | 2/2018 | Shaposhnik |
| 2018/0048523 A1 | 2/2018 | Nakano et al. |
| 2018/0062923 A1 | 3/2018 | Katrekar et al. |
| 2018/0069787 A1 | 3/2018 | Hill et al. |
| 2018/0098269 A1 | 4/2018 | Pradas et al. |
| 2018/0123954 A1 | 5/2018 | Jiang et al. |
| 2018/0124139 A1 | 5/2018 | Jiang et al. |
| 2018/0139123 A1 | 5/2018 | Qiang |
| 2018/0234298 A1 | 8/2018 | Cohn et al. |
| 2018/0241610 A1 | 8/2018 | Wang et al. |
| 2018/0270140 A1 | 9/2018 | Taniguchi et al. |
| 2018/0287966 A1 | 10/2018 | Kamath et al. |
| 2018/0309718 A1 | 10/2018 | Zuo |
| 2018/0338265 A1 | 11/2018 | Goel et al. |
| 2018/0359171 A1 | 12/2018 | Kommula et al. |
| 2018/0367341 A1 | 12/2018 | Wallace et al. |
| 2018/0367417 A1 | 12/2018 | Dixit et al. |
| 2018/0375799 A1 | 12/2018 | Liu et al. |
| 2019/0004780 A1 | 1/2019 | Arumugam et al. |
| 2019/0028299 A1 | 1/2019 | Murray |
| 2019/0028424 A1 | 1/2019 | Mittal et al. |
| 2019/0036729 A1 | 1/2019 | Warade et al. |
| 2019/0036868 A1 | 1/2019 | Chandrashekhar et al. |
| 2019/0059117 A1 | 2/2019 | Shu et al. |
| 2019/0065228 A1 | 2/2019 | Tsirkin et al. |
| 2019/0132241 A1 | 5/2019 | Vattem et al. |
| 2019/0166003 A1 | 5/2019 | Shelke et al. |
| 2019/0173782 A1 | 6/2019 | Soliman et al. |
| 2019/0230025 A1 | 7/2019 | Kommula et al. |
| 2019/0238642 A1 | 8/2019 | Sesham et al. |
| 2019/0273683 A1 | 9/2019 | Jiang et al. |
| 2019/0288871 A1 | 9/2019 | Xie et al. |
| 2020/0044959 A1 | 2/2020 | Bisht et al. |
| 2020/0044969 A1 | 2/2020 | Hao et al. |
| 2020/0052999 A1 | 2/2020 | Lee et al. |
| 2020/0067821 A1 | 2/2020 | Sebastian |
| 2020/0067838 A1 | 2/2020 | Perumal et al. |
| 2020/0092252 A1 | 3/2020 | Tillotson et al. |
| 2020/0092299 A1 | 3/2020 | Srinivasan et al. |
| 2020/0099659 A1 | 3/2020 | Cometto et al. |
| 2020/0112515 A1 | 4/2020 | Brar et al. |
| 2020/0177539 A1 | 6/2020 | Mittal et al. |
| 2020/0213246 A1 | 7/2020 | Pan et al. |
| 2020/0236041 A1 | 7/2020 | Yu et al. |
| 2020/0252291 A1 | 8/2020 | Mittal et al. |
| 2020/0304413 A1 | 9/2020 | MacCarthaigh |
| 2020/0382592 A1 | 12/2020 | Himura et al. |
| 2020/0389796 A1 | 12/2020 | Olofsson et al. |
| 2021/0067408 A1 | 3/2021 | Vaidya et al. |
| 2021/0075630 A1 | 3/2021 | Immidi et al. |
| 2021/0092057 A1 | 3/2021 | Devireddy et al. |
| 2021/0377166 A1 | 12/2021 | Brar et al. |
| 2022/0060415 A1 | 2/2022 | Dutta |
| 2022/0094646 A1 | 3/2022 | Padala et al. |
| 2022/0103487 A1 | 3/2022 | Ang et al. |
| 2022/0150312 A1 | 5/2022 | Ranpise et al. |
| 2022/0200801 A1 | 6/2022 | Potlapally et al. |

FOREIGN PATENT DOCUMENTS

| | | |
|---|---|---|
| CN | 106936777 B | 2/2020 |
| EP | 2680514 A1 | 1/2014 |
| EP | 3462686 A1 | 4/2019 |
| EP | 3605969 A1 | 2/2020 |
| EP | 3617879 A1 | 3/2020 |
| EP | 3675423 A1 | 7/2020 |
| EP | 3716533 A1 | 9/2020 |
| EP | 3783835 A1 | 2/2021 |
| WO | 2010138937 A2 | 12/2010 |
| WO | 2016134380 A1 | 8/2016 |
| WO | 2018027007 A1 | 2/2018 |

OTHER PUBLICATIONS

"Configuring Traffic Storm Control", Cisco Nexus 5000 Series NX-OS Layer 2 Switching Configuration Guide, Release 5.0(3) N2(1), Jul. 29, 2011, pp. 1-4.
U.S. Appl. No. 17/192,681, "Final Office Action", dated Oct. 14, 2022, 18 pages.
U.S. Appl. No. 17/192,681, "Non-Final Office Action", dated Dec. 9, 2022, 16 pages.
U.S. Appl. No. 17/192,681, "Non-Final Office Action", dated Mar. 30, 2022, 34 pages.
U.S. Appl. No. 17/192,681, "Notice of Allowance", dated Mar. 24, 2022, 15 pages.
U.S. Appl. No. 17/237,745, "Non-Final Office Action", dated Feb. 9, 2023, 24 pages.
U.S. Appl. No. 17/237,750, "Non-Final Office Action", dated Jun. 9, 2022, 27 pages.
U.S. Appl. No. 17/237,750, "Notice of Allowance", dated Jan. 25, 2023, 9 pages.
U.S. Appl. No. 17/347,061, "Non-Final Office Action", dated Oct. 25, 2022, 17 pages.
U.S. Appl. No. 17/375,999, "Final Office Action", dated Jan. 5, 2023, 24 pages.
U.S. Appl. No. 17/375,999, "Non-Final Office Action", dated Aug. 4, 2022, 22 pages.
U.S. Appl. No. 17/376,002 "Notice of Allowance", dated May 25, 2022, 8 pages.
U.S. Appl. No. 17/494,725, "Non-Final Office Action", dated Nov. 9, 2022, 29 pages.
U.S. Appl. No. 17/494,725, "Notice of Allowance", dated Mar. 2, 2023, 9 pages.
U.S. Appl. No. 17/494,729, "Non-Final Office Action", Mar. 2, 2023, 21 pages.
Abdou et al., "A Framework and Comparative Analysis of Control Plane Security of SDN and Conventional Networks", Computer Science, Networking and Internet Architecture, Available Online at: https://arxiv.org/abs/1703.06992, Mar. 20, 2017, pp. 1-14.
Azodolmolky et al., "Cloud Computing Networking: Challenges and Opportunities for Innovations", Institute of Electrical and Electronics Engineers Communications Magazine, vol. 51, No. 7, Jul. 2013, pp. 54-62.
Jain et al., "Networking Virtualization and Software Defined Networking for Cloud Computing: A Survey", Institute of Electrical and Electronics Engineers Communications Magazine, vol. 51, No. 11, Nov. 2013, pp. 24-31.
PCT/US2021/027281, "International Preliminary Report on Patentability", dated Dec. 8, 2022, 10 pages.
PCT/US2021/027281, "International Search Report and Written Opinion", dated Jul. 23, 2021, 11 pages.
PCT/US2021/041676, "International Preliminary Report on Patentability", dated Jan. 26, 2023, 9 pages.
PCT/US2021/041676, "International Search Report and Written Opinion", dated Oct. 29, 2021, 13 pages.
PCT/US2021/041678, "International Preliminary Report on Patentability", dated Jan. 26, 2022, 7 pages.
PCT/US2021/041678, "International Search Report and Written Opinion", dated Nov. 16, 2021, 11 pages.
PCT/US2021/041679, "International Preliminary Report on Patentability", dated Jan. 26, 2023, 7 pages.
PCT/US2021/041679, "International Search Report and Written Opinion", dated Nov. 16, 2021, 11 pages.
PCT/US2021/060721, "International Search Report and Written Opinion", dated Mar. 22, 2022, 11 pages.
PCT/US2021/060790, "International Search Report and Written Opinion", dated Mar. 18, 2022, 11 pages.
PCT/US2021/060804, "International Search Report and Written Opinion", dated Mar. 21, 2022, 15 pages.
PCT/US2021/060820, "International Search Report and Written Opinion", dated Mar. 21, 2022, 13 pages.
PCT/US2021/060843, "International Search Report and Written Opinion", dated Mar. 23, 2022, 14 pages.

(56) References Cited

OTHER PUBLICATIONS

PCT/US2022/012513, "International Search Report and Written Opinion", dated Mar. 23, 2022, 11 pages.
PCT/US2022/012529, "International Search Report and Written Opinion", dated Apr. 25, 2022, 15 pages.
PCT/US2022/012538, "International Search Report and Written Opinion", dated Apr. 25, 2022, 13 pages.
Srisuresh et al., "DNS Extensions to Network Address Translators (DNS_ALG)", Network Working Group, Sep. 1, 1999, 29 pages.

* cited by examiner

PACKET FLOW CONTROL IN A HEADER OF A PACKET

BACKGROUND

A cloud infrastructure, such as Oracle Cloud Infrastructure (OCI), can provide a set of cloud services that enable entities (e.g., enterprises) subscribing to these services to build and run a wide range of applications and services in a highly available cloud-hosted environment. The subscribing entities are referred to as customers of the cloud services provider. A cloud infrastructure can offer high-performance compute, storage, and network capabilities in a flexible overlay virtual network that runs on top of the physical underlay network and that is securely accessible from an enterprise's on-premises network. A cloud infrastructure, such as OCI, generally allows customers to manage their cloud-based workloads in the same way they manage their on-premises workloads. Thus, organizations can get all the benefits of the cloud with the same control, isolation, security, and predictable performance as their on-premises network.

Virtual networking is a foundation for cloud infrastructures and cloud applications because virtual networking enables the ability to access, connect, secure, and modify cloud resources. Virtual networking enables communication between multiple computers, virtual machines (VMs), virtual servers, or other devices across different physical locations. While physical networking connects computer systems through cabling and other hardware, virtual networking uses software management to connect computers and servers in different physical locations over the Internet. A virtual network uses virtualized versions of traditional network components, such as network switches, routers, and adapters, allowing for more efficient routing and easier network configuration and reconfiguration.

BRIEF SUMMARY

The present disclosure relates generally to controlling packet flows. In an example, a compute instance generates a packet to be sent on a virtual network. The packet's header includes scoping data that indicates a network boundary within which the packet is permitted and/or prohibited to flow. A network virtualization device of a substrate network receives the packet. The network virtualization device determines the scoping data from the header and, based on network configuration information, determines the forward flow of the packet. If the forward flow falls within a permitted network boundary indicated by the scoping data, the network virtualization device sends the packet forward. Otherwise, the packet is dropped.

In an illustration, a compute instance is hosted within a first virtual cloud network (VCN) of a customer. Input of the customer may be received and may indicate that access to the compute instance is permitted to other compute instances within a peered second VCN and is prohibited to resources from an on-premise network of the customer. A packet flow rule can be generated for the compute instance and stored for a virtual network interface card (VNIC) hosted on a first network virtualization device and associated with the compute instance. The compute instance generates a first packet that is destined to a compute instance of the second VCN. Upon receiving this first packet, the first network virtualization device identifies the packet flow rule, and generates and adds scoping data to the first packet, where this data permits the first packet to be sent to the second VCN but not the on-premise network. The first network virtualization device sends the first packet (updated to include the scoping data) on a substrate network. A second network virtualization device, such as one hosting a dynamic routing gateway (DRG), receives the first packet from the substrate network and determines, based on the scoping data, that it can be sent to the second VCN. Accordingly, the first packet is sent to the second VCN. In comparison, the compute instance generates a second packet that is destined to a resource of the on-premise network. Upon receiving this second packet, the first network virtualization device identifies the packet flow rule, and generates and adds similar scoping data to the second packet, where this data permits the second packet to be sent to the second VCN but not the on-premise network. Upon receiving the second packet, the second network virtualization device determines, based on the scoping data, that it cannot be sent to the on-premise network. Accordingly, the second packet is dropped.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and embodiments, will become more apparent upon referring to the following specification, claims, and accompanying drawings.

BRIEF DESCRIPTION OF THE DRAWINGS

Illustrative examples are described in detail below with reference to the following figures.

DETAILED DESCRIPTION

Figure 1:
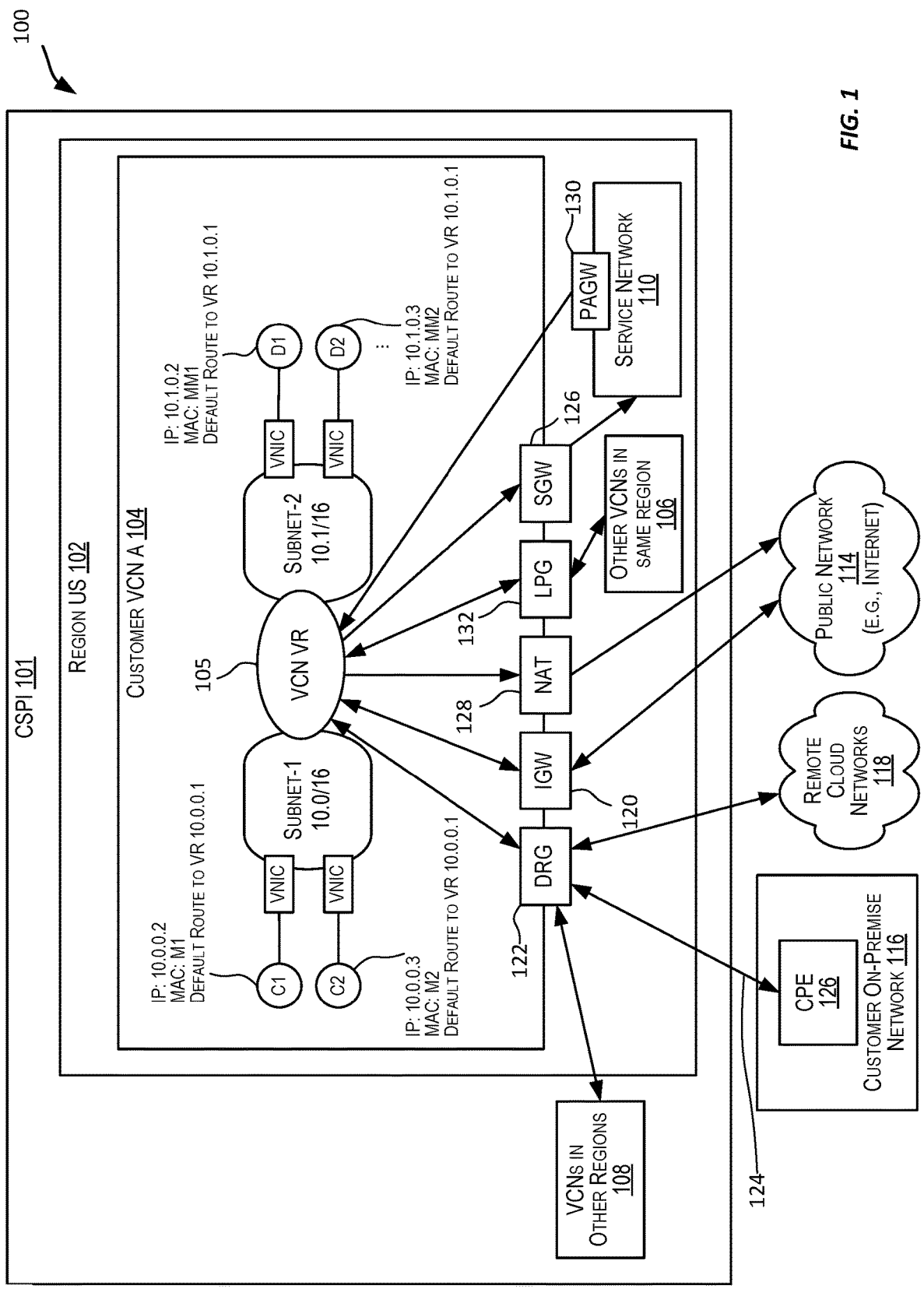
FIG. 1 is a high level diagram of a distributed environment showing a virtual or overlay cloud network hosted by a cloud service provider infrastructure according to certain embodiments.

Techniques related to controlling packet flows are described. In an example, a customer of a cloud infrastructure may operate a virtual network, such as a virtual cloud network, hosted on the cloud infrastructure. The flow of packets from and to a set of compute instances can be controlled using various types of policies and rules. Commonly, security policies and routing rules can be implemented to control the flow and can result in effective controls. Nonetheless, additional flow control improvements can be achieved as described in the present disclosure.

In an example, the customer may select a set of network boundaries within which the packet flow is permitted. Outside such boundaries, the packet flow can be prohibited. For each of the compute instances of the customer's virtual network, a packet flow rule can be generated and stored, where this rule indicates the permissions and/or prohibitions of the compute instance's packet flows within the network boundaries given the customer's selection. When a compute instance generates and sends a packet addressed to a destination (egress or outbound traffic), the corresponding packet flow rule is used to determine whether the flow of the packet falls within the permitted network boundary(ies). If not, the packet is dropped. Otherwise, the packet can flow to the destination along a network path that can include a set of network virtualization devices and/or functions hosted thereat (e.g., routers, switches, load balancers, gateways, etc.). In this case, scoping data can be included in the header of the packet to indicate the permitted network boundary(ies) and is used to enforce the packet flow. In particular, each or a subset of the network virtualization devices or functions that receives and processes the packet can extract the scoping data from the packet and then determine whether the packet can be sent forward or should be dropped based on the permitted network boundary(ies) indicated by the scoping data. Similarly, and for ingress or inbound traffic, when a packet is addressed to the compute instance, a network virtualization device or a function hosted thereat can receive and process this packet to determine the scoping data and enforce the corresponding packet flow depending on whether the compute instance belongs to a permitted network boundary.

To illustrate, consider an example of a database of a customer hosted as a compute instance in a virtual cloud network of the customer. The customer can indicate that access to the database is permitted within a layer-3 subnetwork of the virtual cloud network. Accordingly, when a packet is sent by the compute instance and includes database entries in its payload, scoping data can be added as metadata to a header of the packet. This metadata can indicate that the scope is the layer-3 subnet. If a destination of the packet is within the layer-3 subnet, the packet flows to the destination. Otherwise, the packet is dropped before it reaches the destination. In another illustration, the customer indicates that the scope is permitted within a peered virtual cloud network but not a public network. Here, the metadata indicates that the packet can be sent to any compute instance hosted in the peered virtual cloud network but cannot reach the public network. Accordingly, if the packet reaches a dynamic routing gateway on a remote peering connection, the dynamic routing gateway can send the packet onto the peered virtual cloud network. However, if an Internet gateway receives the packet, this gateway drops the packet.

By using scoping data, several technological improvements can be made. For instance, a security policy or a routing rule may be configured incorrectly (e.g., includes an error) or a software bug may exist that can compromise the security policy or routing rule. In such situations, the scoping data can provide another protection layer because it represents a way for the packet flow rule to travel with the packet and a way for enforcing this rule along one or more hops of the network path.

Example Virtual Networking Architectures

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The virtual or overlay networks can include one or more virtual cloud networks (VCNs). The virtual networks are implemented using software virtualization technologies (e.g., hypervisors, functions performed by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)), Virtual Extensible LAN (VXLAN—IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant. In a multi-tenancy architecture, a software or a hardware component serves multiple customers or tenants. Thus, in a multi-tenancy architecture, CSPI resources are shared between multiple customers or tenants. In a multi-tenancy situation, precautions are taken and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual networks. Both the physical IP addresses and overlay IP addresses are types of real IP addresses. These are separate from virtual IP addresses, where a virtual IP address maps to multiple real IP addresses. A virtual IP address provides a 1-to-many mapping between the virtual IP address and multiple real IP addresses.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in an virtual network built on top of the physical network components. In certain embodiments, the CSPI is organized and hosted in realms, regions and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a virtual cloud network (VCN), or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premise networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with public accessible endpoints ("public endpoints") over a public network such as the Internet, with other instances in the same VCN or other VCNs (e.g., the customer's other VCNs, or VCNs not belonging to the customer), with the customer's on-premise data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN.

Each compute instance is associated with a virtual network interface card (VNIC), that enables the compute instance to participate in a subnet of a VCN. A VNIC is a logical representation of physical Network Interface Card (NIC). In general. a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane. The configuration information for a VCN may include, for example, information about: the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP) and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane. Examples of a VCN Control Plane are also depicted in FIGS. 17, 18, 19, and 20 (see references 1716, 1816, 1916, and 2016) and described below.

A customer may create one or more VCNs using resources hosted by CSPI. A compute instance deployed on a customer VCN may communicate with different endpoints. These endpoints can include endpoints that are hosted by CSPI and endpoints outside CSPI.

Various different architectures for implementing cloud-based service using CSPI are depicted in FIGS. 1, 2, 3, 4, 5, 17, 18, 19, and 21, and are described below. FIG. 1 is a high level diagram of a distributed environment 100 showing an overlay or customer VCN hosted by CSPI according to certain embodiments. The distributed environment depicted in FIG. 1 includes multiple components in the overlay network. Distributed environment 100 depicted in FIG. 1 is merely an example and is not intended to unduly limit the scope of claimed embodiments. Many variations, alternatives, and modifications are possible. For example, in some implementations, the distributed environment depicted in FIG. 1 may have more or fewer systems or components than those shown in FIG. 1, may combine two or more systems, or may have a different configuration or arrangement of systems.

As shown in the example depicted in FIG. 1, distributed environment 100 comprises CSPI 101 that provides services and resources that customers can subscribe to and use to build their virtual cloud networks (VCNs). In certain embodiments, CSPI 101 offers IaaS services to subscribing customers. The data centers within CSPI 101 may be organized into one or more regions. One example region "Region US" 102 is shown in FIG. 1. A customer has configured a customer VCN 104 for region 102. The customer may deploy various compute instances on VCN 104, where the compute instances may include virtual machines or bare metal instances. Examples of instances include applications, database, load balancers, and the like.

In the embodiment depicted in FIG. 1, customer VCN 104 comprises two subnets, namely, "Subnet-1" and "Subnet-2", each subnet with its own CIDR IP address range. In FIG. 1, the overlay IP address range for Subnet-1 is 10.0/16 and the address range for Subnet-2 is 10.1/16. A VCN Virtual Router 105 represents a logical gateway for the VCN that enables communications between subnets of the VCN 104, and with other endpoints outside the VCN. VCN VR 105 is configured to route traffic between VNICs in VCN 104 and gateways associated with VCN 104. VCN VR 105 provides a port for each subnet of VCN 104. For example, VR 105 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 101. A compute instance participates in a subnet via a VNIC associated with the compute instance. For example, as shown in FIG. 1, a compute instance C1 is part of Subnet-1 via a VNIC associated with the compute instance. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 1, compute instance C1 has an overlay IP address of 10.0.0.2 and a MAC address of M1, while compute instance C2 has an private overlay IP address of 10.0.0.3 and a MAC address of M2. Each compute instance in Subnet-1, including compute instances C1 and C2, has a default route to VCN VR 105 using IP address 10.0.0.1, which is the IP address for a port of VCN VR 105 for Subnet-1.

Subnet-2 can have multiple compute instances deployed on it, including virtual machine instances and/or bare metal instances. For example, as shown in FIG. 1, compute instances D1 and D2 are part of Subnet-2 via VNICs associated with the respective compute instances. In the embodiment depicted in FIG. 1, compute instance D1 has an overlay IP address of 10.1.0.2 and a MAC address of MM1, while compute instance D2 has an private overlay IP address of 10.1.0.3 and a MAC address of MM2. Each compute instance in Subnet-2, including compute instances D1 and D2, has a default route to VCN VR 105 using IP address 10.1.0.1, which is the IP address for a port of VCN VR 105 for Subnet-2.

VCN A 104 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 104 can communicate with various different endpoints. These endpoints may include endpoints that are hosted by CSPI 200 and endpoints outside CSPI 200. Endpoints that are hosted by CSPI 101 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 106 or 110, communications between a compute instance in Subnet-1 and an endpoint in service network 110 in the same region); or an endpoint in a VCN in a different region (e.g., communications between a compute instance in Subnet-1 and an endpoint in a VCN in a different region 108). A compute instance in a subnet hosted by CSPI 101 may also communicate with endpoints that are not hosted by CSPI 101 (i.e., are outside CSPI 101). These outside endpoints include endpoints in the customer's on-premise network 116, endpoints within other remote cloud hosted networks 118, public endpoints 114 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 1 wants to send a packet to compute instance D1 in Subnet-2, the packet is first processed by the VNIC associated with compute instance C1. The VNIC associated with compute instance C1 is configured to route the packet to the VCN VR 105 using default route or port 10.0.0.1 of the VCN VR. VCN VR 105 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 104 to an endpoint that is outside VCN 104, the communication is facilitated by the VNIC associated with the source compute instance, VCN VR 105, and gateways associated with VCN 104. One or more types of gateways may be associated with VCN 104. A gateway is an interface between a VCN and another endpoint, where the another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 104. The packet may be first processed by the VNIC associated with source compute instance C1. The VNIC processing determines that the destination for the packet is outside the Subnet-1 of C1. The VNIC associated with C1 may forward the packet to VCN VR 105 for VCN 104. VCN VR 105 then processes the packet and as part of the processing, based upon the destination for the packet, determines a particular gateway associated with VCN 104 as the next hop for the packet. VCN VR 105 may then forward the packet to the particular identified gateway. For example, if the destination is an endpoint within the customer's on-premise network, then the packet may be forwarded by VCN VR 105 to Dynamic Routing Gateway (DRG) gateway 122 configured for VCN 104. The packet may then be forwarded from the gateway to a next hop to facilitate communication of the packet to it final intended destination.

Various different types of gateways may be configured for a VCN. Examples of gateways that may be configured for a VCN are depicted in FIG. 1 and described below. Examples of gateways associated with a VCN are also depicted in FIGS. 17, 18, 19, and 20 (for example, gateways referenced by reference numbers 1734, 1736, 1738, 1834, 1836, 1838, 1934, 1936, 1938, 2034, 2036, and 2038) and described below. As shown in the embodiment depicted in FIG. 1, a Dynamic Routing Gateway (DRG) 122 may be added to or be associated with customer VCN 104 and provides a path for private network traffic communication between customer VCN 104 and another endpoint, where the another endpoint can be the customer's on-premise network 116, a VCN 108 in a different region of CSPI 101, or other remote cloud networks 118 not hosted by CSPI 101. Customer on-premise network 116 may be a customer network or a customer data center built using the customer's resources. Access to customer on-premise network 116 is generally very restricted. For a customer that has both a customer on-premise network 116 and one or more VCNs 104 deployed or hosted in the cloud by CSPI 101, the customer may want their on-premise network 116 and their cloud-based VCN 104 to be able to communicate with each other. This enables a customer to build an extended hybrid environment encompassing the customer's VCN 104 hosted by CSPI 101 and their on-premises network 116. DRG 122 enables this communication. To enable such communications, a communication channel 124 is set up where one endpoint of the channel is in customer on-premise network 116 and the other endpoint is in CSPI 101 and connected to customer VCN 104. Communication channel 124 can be over public communication networks such as the Internet or private communication networks. Various different communication protocols may be used such as IPsec VPN technology over a public communication network such as the Internet, Oracle's Fast-Connect technology that uses a private network instead of a public network, and others. The device or equipment in customer on-premise network 116 that forms one end point for communication channel 124 is referred to as the customer premise equipment (CPE), such as CPE 126 depicted in FIG. 1. On the CSPI 101 side, the endpoint may be a host machine executing DRG 122.

In certain embodiments, a Remote Peering Connection (RPC) can be added to a DRG, which allows a customer to peer one VCN with another VCN in a different region. Using such an RPC, customer VCN 104 can use DRG 122 to connect with a VCN 108 in another region. DRG 122 may also be used to communicate with other remote cloud networks 118, not hosted by CSPI 101 such as a Microsoft Azure cloud, Amazon AWS cloud, and others.

As shown in FIG. 1, an Internet Gateway (IGW) 120 may be configured for customer VCN 104 the enables a compute instance on VCN 104 to communicate with public endpoints 114 accessible over a public network such as the Internet. IGW 1120 is a gateway that connects a VCN to a public network such as the Internet. IGW 120 enables a public subnet (where the resources in the public subnet have public overlay IP addresses) within a VCN, such as VCN 104, direct access to public endpoints 112 on a public network 114 such as the Internet. Using IGW 120, connections can be initiated from a subnet within VCN 104 or from the Internet.

A Network Address Translation (NAT) gateway 128 can be configured for customer's VCN 104 and enables cloud resources in the customer's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 104, with private access to public endpoints on the Internet. In NAT gateways, connections can be initiated only from the private subnet to the public Internet and not from the Internet to the private subnet.

In certain embodiments, a Service Gateway (SGW) 126 can be configured for customer VCN 104 and provides a path for private network traffic between VCN 104 and supported services endpoints in a service network 110. In certain embodiments, service network 110 may be provided by the CSP and may provide various services. An example of such a service network is Oracle's Services Network, which provides various services that can be used by customers. For example, a compute instance (e.g., a database system) in a private subnet of customer VCN 104 can back up data to a service endpoint (e.g., Object Storage) without needing public IP addresses or access to the Internet. In certain embodiments, a VCN can have only one SGW, and connections can only be initiated from a subnet within the VCN and not from service network 110. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 126 uses the concept of a service Classless Inter-Domain Routing (CIDR) label, which is a string that represents all the regional public IP address ranges for the service or group of services of interest. The customer uses the service CIDR label when they configure the SGW and related route rules to control traffic to the service. The customer can optionally utilize it when configuring security rules without needing to adjust them if the service's public IP addresses change in the future.

A Local Peering Gateway (LPG) 132 is a gateway that can be added to customer VCN 104 and enables VCN 104 to peer with another VCN in the same region. Peering means that the VCNs communicate using private IP addresses, without the traffic traversing a public network such as the Internet or without routing the traffic through the customer's on-premises network 116. In preferred embodiments, a VCN has a separate LPG for each peering it establishes. Local Peering or VCN Peering is a common practice used to establish network connectivity between different applications or infrastructure management functions.

Service providers, such as providers of services in service network 110, may provide access to services using different access models. According to a public access model, services may be exposed as public endpoints that are publicly accessible by compute instance in a customer VCN via a public network such as the Internet and or may be privately accessible via SGW 126. According to a specific private access model, services are made accessible as private IP endpoints in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. A PE thus provides a way to present a service within a private customer VCN subnet using a VNIC. Since the endpoint is exposed as a VNIC, all the features associates with a VNIC such as routing rules, security lists, etc., are now available for the PE VNIC.

A service provider can register their service to enable access through a PE. The provider can associate policies with the service that restricts the service's visibility to the customer tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the customer VCN can access the service by sending traffic to the private IP address of the PE in the customer VCN. A Private Access Gateway (PAGW) 130 is a gateway resource that can be attached to a service provider VCN (e.g., a VCN in service network 110) that acts as an ingress/egress point for all traffic from/to customer subnet private endpoints. PAGW 130 enables a provider to scale the number of PE connections without utilizing its internal IP address resources. A provider needs only configure one PAGW for any number of services registered in a single VCN. Providers can represent a service as a private endpoint in multiple VCNs of one or more customers. From the customer's perspective, the PE VNIC, which, instead of being attached to a customer's instance, appears attached to the service with which the customer wishes to interact. The traffic destined to the private endpoint is routed via PAGW 130 to the service. These are referred to as customer-to-service private connections (C2S connections).

The PE concept can also be used to extend the private access for the service to customer's on-premises networks and data centers, by allowing the traffic to flow through FastConnect/IPsec links and the private endpoint in the customer VCN. Private access for the service can also be extended to the customer's peered VCNs, by allowing the traffic to flow between LPG 132 and the PE in the customer's VCN.

A customer can control routing in a VCN at the subnet level, so the customer can specify which subnets in the customer's VCN, such as VCN 104, use each gateway. A VCN's route tables are used to decide if traffic is allowed out of a VCN through a particular gateway. For example, in a particular instance, a route table for a public subnet within customer VCN 104 may send non-local traffic through IGW 120. The route table for a private subnet within the same customer VCN 104 may send traffic destined for CSP services through SGW 126. All remaining traffic may be sent via the NAT gateway 128. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked and the response is automatically allowed without an explicit security list rule for the response traffic) or stateless.

Access from a customer VCN (i.e., by a resource or compute instance deployed on VCN 104) can be categorized as public access, private access, or dedicated access. Public access refers to an access model where a public IP address or a NAT is used to access a public endpoint. Private access enables customer workloads in VCN 104 with private IP addresses (e.g., resources in a private subnet) to access services without traversing a public network such as the Internet. In certain embodiments, CSPI 101 enables customer VCN workloads with private IP addresses to access the (public service endpoints of) services using a service gateway. A service gateway thus offers a private access model by establishing a virtual link between the customer's VCN and the service's public endpoint residing outside the customer's private network.

Additionally, CSPI may offer dedicated public access using technologies such as FastConnect public peering where customer on-premises instances can access one or more services in a customer VCN using a FastConnect connection and without traversing a public network such as the Internet. CSPI also may also offer dedicated private access using FastConnect private peering where customer on-premises instances with private IP addresses can access the customer's VCN workloads using a FastConnect connection. FastConnect is a network connectivity alternative to using the public Internet to connect a customer's on-premise network to CSPI and its services. FastConnect provides an easy, elastic, and economical way to create a dedicated and private connection with higher bandwidth options and a more reliable and consistent networking experience when compared to Internet-based connections.

Figure 2:
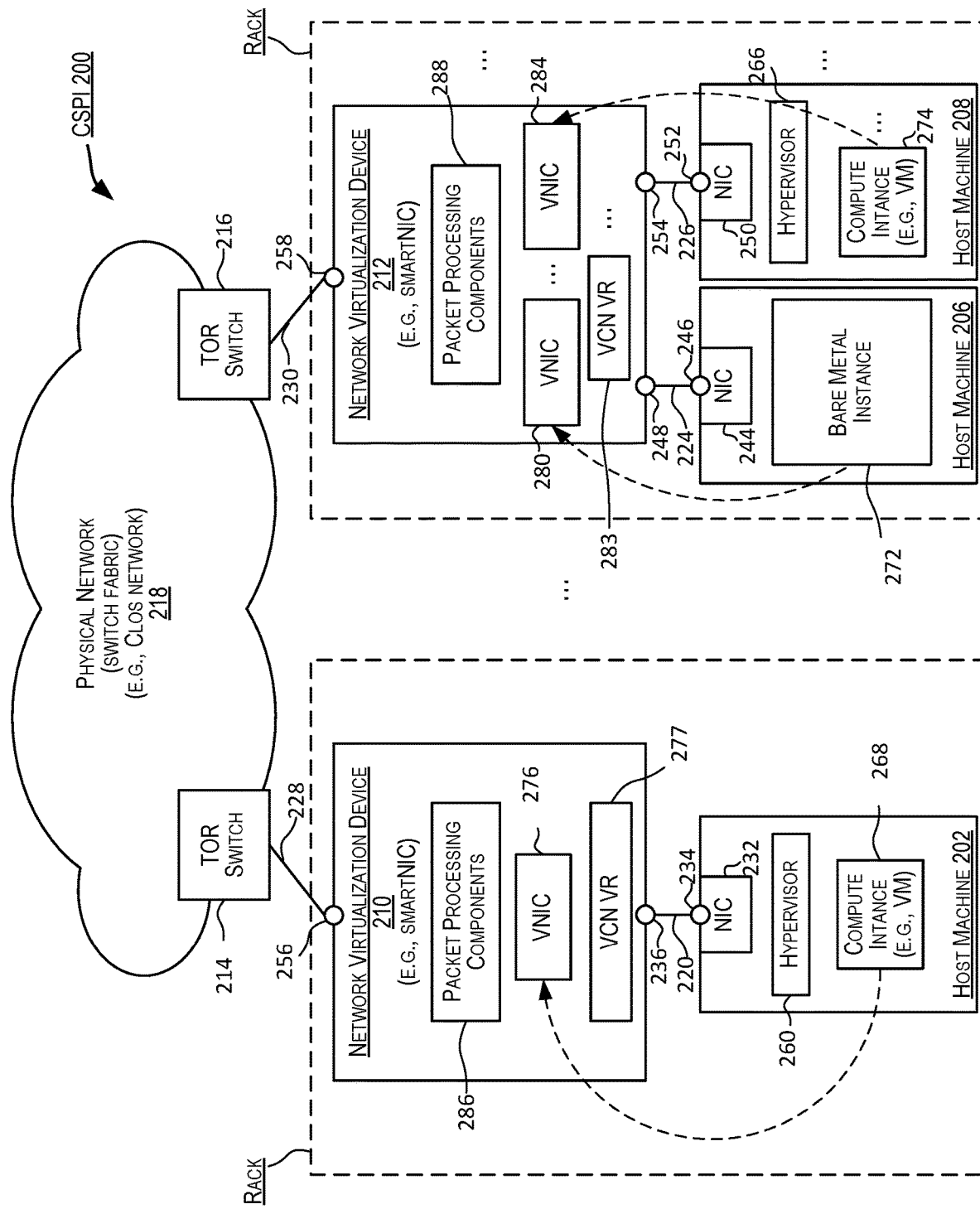
FIG. 2 depicts a simplified architectural diagram of the physical components in the physical network within CSPI according to certain embodiments.

FIG. 1 and the accompanying description above describes various virtualized components in an example virtual network. As described above, the virtual network is built on the underlying physical or substrate network. FIG. 2 depicts a simplified architectural diagram of the physical components in the physical network within CSPI 200 that provide the underlay for the virtual network according to certain embodiments. As shown, CSPI 200 provides a distributed environment comprising components and resources (e.g., compute, memory, and networking resources) provided by a cloud service provider (CSP). These components and resources are used to provide cloud services (e.g., IaaS services) to subscribing customers, i.e., customers that have subscribed to one or more services provided by the CSP. Based upon the services subscribed to by a customer, a subset of resources (e.g., compute, memory, and networking resources) of CSPI 200 are provisioned for the customer. Customers can then build their own cloud-based (i.e., CSPI-hosted) customizable and private virtual networks using physical compute, memory, and networking resources provided by CSPI 200. As previously indicated, these customer networks are referred to as virtual cloud networks (VCNs). A customer can deploy one or more customer resources, such as compute instances, on these customer VCNs. Compute instances can be in the form of virtual machines, bare metal instances, and the like. CSPI 200 provides infrastructure and a set of complementary cloud services that enable customers to build and run a wide range of applications and services in a highly available hosted environment.

In the example embodiment depicted in FIG. 2, the physical components of CSPI 200 include one or more physical host machines or physical servers (e.g., 202, 206, 208), network virtualization devices (NVDs) (e.g., 210, 212), top-of-rack (TOR) switches (e.g., 214, 216), and a physical network (e.g., 218), and switches in physical network 218. The physical host machines or servers may host and execute various compute instances that participate in one or more subnets of a VCN. The compute instances may include virtual machine instances, and bare metal instances. For example, the various compute instances depicted in FIG. 1 may be hosted by the physical host machines depicted in FIG. 2. The virtual machine compute instances in a VCN may be executed by one host machine or by multiple different host machines. The physical host machines may also host virtual host machines, container-based hosts or functions, and the like. The VNICs and VCN VR depicted in FIG. 1 may be executed by the NVDs depicted in FIG. 2. The gateways depicted in FIG. 1 may be executed by the host machines and/or by the NVDs depicted in FIG. 2.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 2, host machines 202 and 208 execute hypervisors 260 and 266, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 2, hypervisor 260 may sit on top of the OS of host machine 202 and enables the computing resources (e.g., processing, memory, and networking resources) of host machine 202 to be shared between compute instances (e.g., virtual machines) executed by host machine 202. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 2 may have the same or different types of hypervisors.

A compute instance can be a virtual machine instance or a bare metal instance. In FIG. 2, compute instances 268 on host machine 202 and 274 on host machine 208 are examples of virtual machine instances. Host machine 206 is an example of a bare metal instance that is provided to a customer.

In certain instances, an entire host machine may be provisioned to a single customer, and all of the one or more compute instances (either virtual machines or bare metal instance) hosted by that host machine belong to that same customer. In other instances, a host machine may be shared between multiple customers (i.e., multiple tenants). In such a multi-tenancy scenario, a host machine may host virtual machine compute instances belonging to different customers. These compute instances may be members of different VCNs of different customers. In certain embodiments, a bare metal compute instance is hosted by a bare metal server without a hypervisor. When a bare metal compute instance is provisioned, a single customer or tenant maintains control of the physical CPU, memory, and network interfaces of the host machine hosting the bare metal instance and the host machine is not shared with other customers or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 2, host machine 202 executes a virtual machine compute instance 268 that is associated with VNIC 276, and VNIC 276 is executed by NVD 210 connected to host machine 202. As another example, bare metal instance 272 hosted by host machine 206 is associated with VNIC 280 that is executed by NVD 212 connected to host machine 206. As yet another example, VNIC 284 is associated with compute instance 274 executed by host machine 208, and VNIC 284 is executed by NVD 212 connected to host machine 208.

For compute instances hosted by a host machine, an NVD connected to that host machine also executes VCN VRs corresponding to VCNs of which the compute instances are members. For example, in the embodiment depicted in FIG. 2, NVD 210 executes VCN VR 277 corresponding to the VCN of which compute instance 268 is a member. NVD 212 may also execute one or more VCN VRs 283 corresponding to VCNs corresponding to the compute instances hosted by host machines 206 and 208.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 2, host machine 202 is connected to NVD 210 using link 220 that extends between a port 234 provided by a NIC 232 of host machine 202 and between a port 236 of NVD 210. Host machine 206 is connected to NVD 212 using link 224 that extends between a port 246 provided by a NIC 244 of host machine 206 and between a port 248 of NVD 212. Host machine 208 is connected to NVD 212 using link 226 that extends between a port 252 provided by a NIC 250 of host machine 208 and between a port 254 of NVD 212.

The NVDs are in turn connected via communication links to top-of-the-rack (TOR) switches, which are connected to physical network 218 (also referred to as the switch fabric). In certain embodiments, the links between a host machine and an NVD, and between an NVD and a TOR switch are Ethernet links. For example, in FIG. 2, NVDs 210 and 212 are connected to TOR switches 214 and 216, respectively, using links 228 and 230. In certain embodiments, the links 220, 224, 226, 228, and 230 are Ethernet links. The collection of host machines and NVDs that are connected to a TOR is sometimes referred to as a rack.

Figure 5:
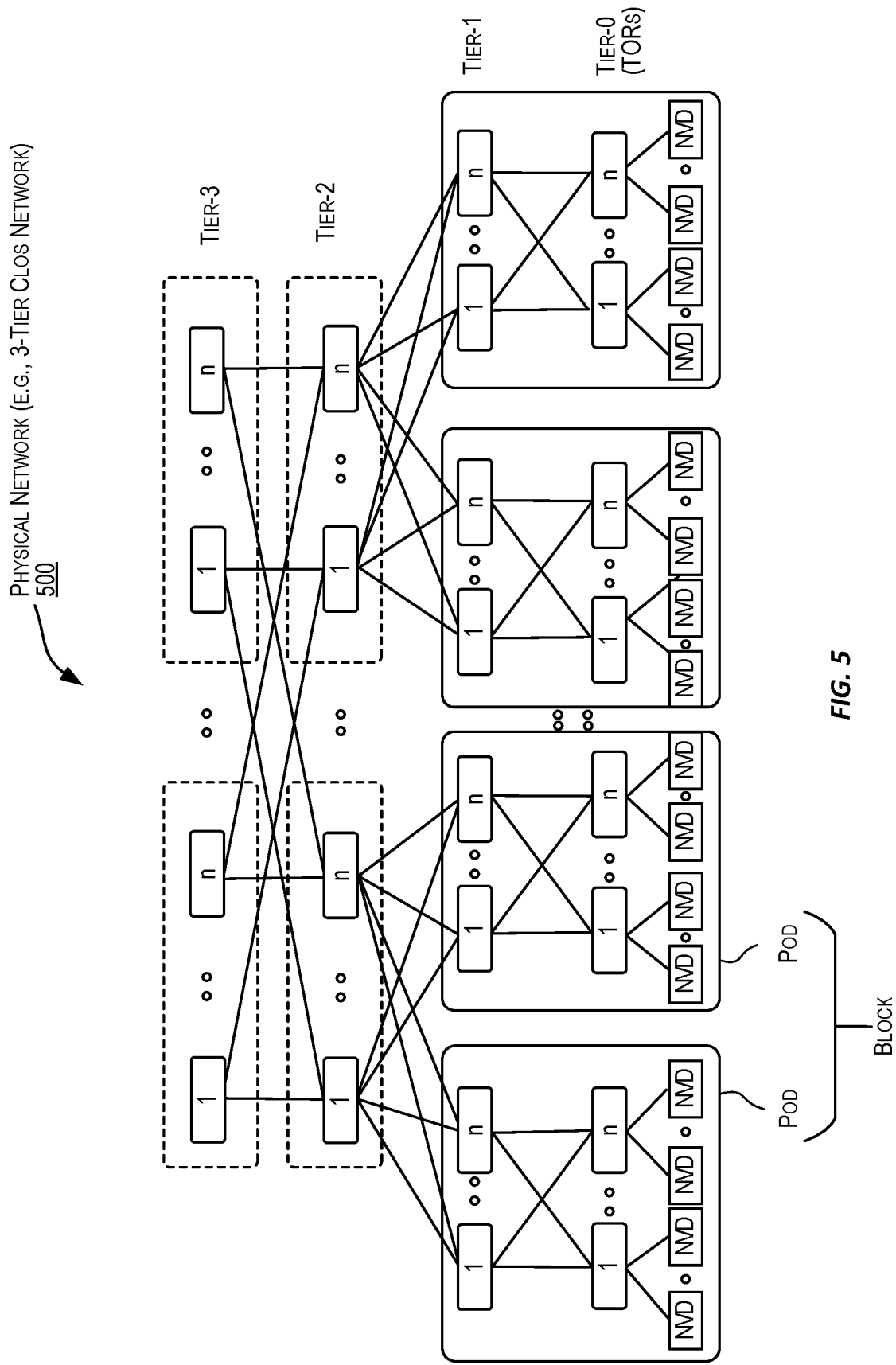
FIG. 5 depicts a simplified block diagram of a physical network provided by a CSPI according to certain embodiments.

Physical network 218 provides a communication fabric that enables TOR switches to communicate with each other. Physical network 218 can be a multi-tiered network. In certain implementations, physical network 218 is a multi-tiered Clos network of switches, with TOR switches 214 and 216 representing the leaf level nodes of the multi-tiered and multi-node physical switching network 218. Different Clos network configurations are possible including but not limited to a 2-tier network, a 3-tier network, a 4-tier network, a 5-tier network, and in general a "n"-tiered network. An example of a Clos network is depicted in FIG. 5 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 2, host machine 202 is connected to NVD 210 via NIC 232 of host machine 202. In a many-to-one configuration, multiple host machines are connected to one NVD. For example, in FIG. 2, host machines 206 and 208 are connected to the same NVD 212 via NICs 244 and 250, respectively.

Figure 3:
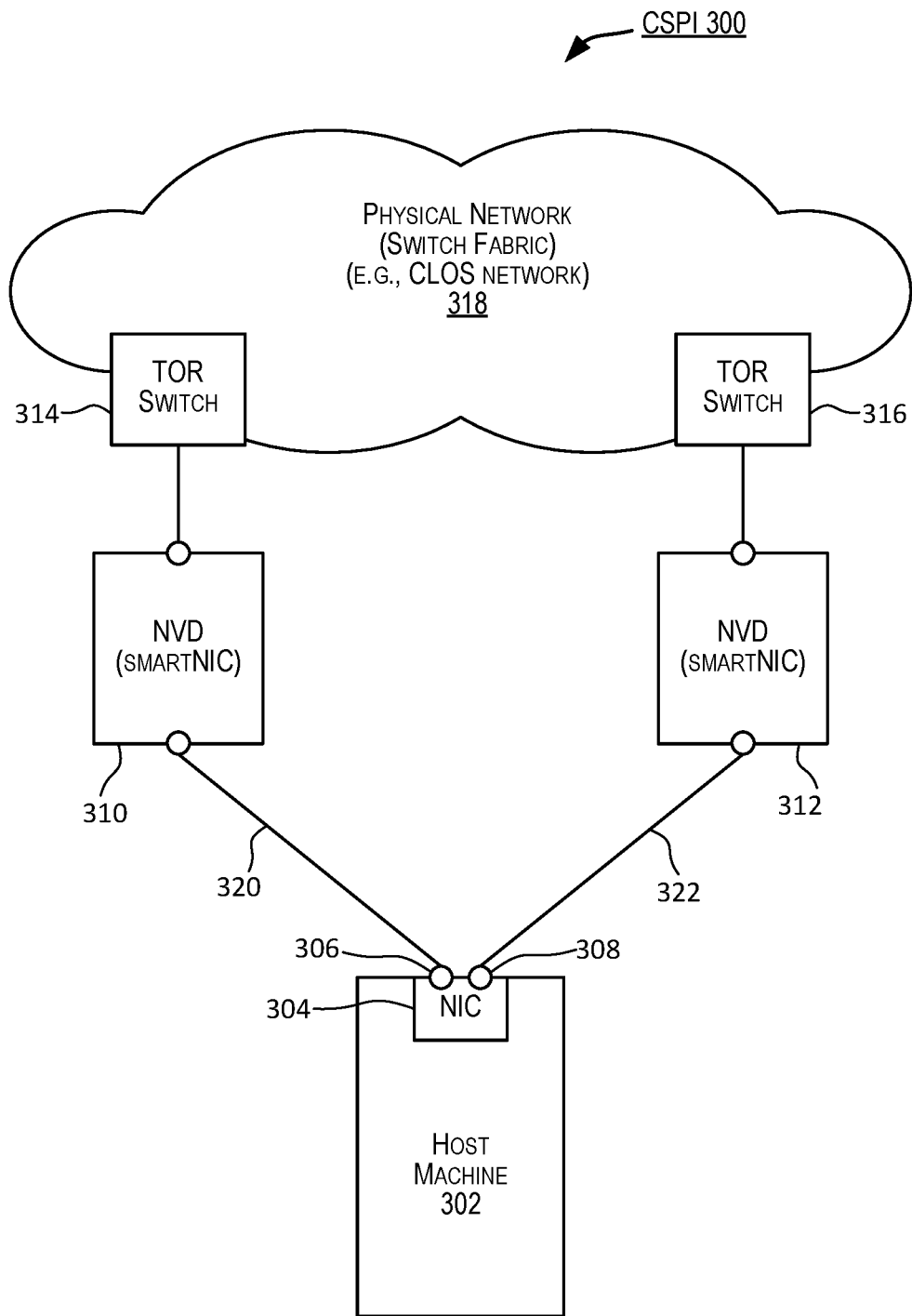
FIG. 3 shows an example arrangement within CSPI where a host machine is connected to multiple network virtualization devices (NVDs) according to certain embodiments.

In a one-to-many configuration, one host machine is connected to multiple NVDs. FIG. 3 shows an example within CSPI 300 where a host machine is connected to multiple NVDs. As shown in FIG. 3, host machine 302 comprises a network interface card (NIC) 304 that includes multiple ports 306 and 308. Host machine 300 is connected to a first NVD 310 via port 306 and link 320, and connected to a second NVD 312 via port 308 and link 322. Ports 306 and 308 may be Ethernet ports and the links 320 and 322 between host machine 302 and NVDs 310 and 312 may be Ethernet links. NVD 310 is in turn connected to a first TOR switch 314 and NVD 312 is connected to a second TOR switch 316. The links between NVDs 310 and 312, and TOR switches 314 and 316 may be Ethernet links. TOR switches 314 and 316 represent the Tier-0 switching devices in multi-tiered physical network 318.

The arrangement depicted in FIG. 3 provides two separate physical network paths to and from physical switch network 318 to host machine 302: a first path traversing TOR switch 314 to NVD 310 to host machine 302, and a second path traversing TOR switch 316 to NVD 312 to host machine 302. The separate paths provide for enhanced availability (referred to as high availability) of host machine 302. If there are problems in one of the paths (e.g., a link in one of the paths goes down) or devices (e.g., a particular NVD is not functioning), then the other path may be used for communications to/from host machine 302.

In the configuration depicted in FIG. 3, the host machine is connected to two different NVDs using two different ports provided by a NIC of the host machine. In other embodiments, a host machine may include multiple NICs that enable connectivity of the host machine to multiple NVDs.

Referring back to FIG. 2, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 2, the NVDs 210 and 212 may be implemented as smartNICs that are connected to host machines 202, and host machines 206 and 208, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 200. For example, an NVD may be embodied in a host machine where the functions performed by an NVD are performed by the host machine. As another example, an NVD may be part of a TOR switch or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to customers, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 2, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 2 include port 236 on NVD 210, and ports 248 and 254 on NVD 212. A network-facing port of an NVD is a port that is used to connect the NVD to a TOR switch. Examples of network-facing ports in FIG. 2 include port 256 on NVD 210, and port 258 on NVD 212. As shown in FIG. 2, NVD 210 is connected to TOR switch 214 using link 228 that extends from port 256 of NVD 210 to the TOR switch 214.

Likewise, NVD 212 is connected to TOR switch 216 using link 230 that extends from port 258 of NVD 212 to the TOR switch 216.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two end-points (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with cis in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. Examples of a VCN Control Plane are also depicted in FIGS. 17, 18, 19, and 20 (see references 1716, 1816, 1916, and 2016) and described below. Examples of a VCN Data Plane are depicted in FIGS. 17, 18, 19, and 20 (see references 1718, 1818, 1918, and 2018) and described below. The control plane functions include functions used for configuring a network (e.g., setting up routes and route tables, configuring VNICs, etc.) that controls how data is to be forwarded. In certain embodiments, a VCN Control Plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the customer's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 2, NVD 210 executes the functionality for VNIC 276 that is associated with compute instance 268 hosted by host machine 202 connected to NVD 210. As another example, NVD 212 executes VNIC 280 that is associated with bare metal compute instance 272 hosted by host machine 206, and executes VNIC 284 that is associated with compute instance 274 hosted by host machine 208. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 2, NVD 210 executes VCN VR 277 corresponding to the VCN to which compute instance 268 belongs. NVD 212 executes one or more VCN VRs 283 corresponding to one or more VCNs to which compute instances hosted by host machines 206 and 208 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 2. For example, NVD 210 comprises packet processing components 286 and NVD 212 comprises packet processing components 288. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 1 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 1 may be executed or hosted by one or more of the physical components depicted in FIG. 2. For example, the compute instances in a VCN may be executed or hosted by one or more host machines depicted in FIG. 2. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a customer VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the customer's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 2, a packet originating from compute instance 268 may be communicated from host machine 202 to NVD 210 over link 220 (using NIC 232). On NVD 210, VNIC 276 is invoked since it is the VNIC associated with source compute instance 268. VNIC 276 is configured to examine the encapsulated information in the packet, and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 200 and endpoints outside CSPI 200. Endpoints hosted by CSPI 200 may include instances in the same VCN or other VCNs, which may be the customer's VCNs, or VCNs not belonging to the customer. Communications between endpoints hosted by CSPI 200 may be performed over physical network 218. A compute instance may also communicate with endpoints that are not hosted by CSPI 200, or are outside CSPI 200. Examples of these endpoints include endpoints within a customer's on-premise network or data center, or public endpoints accessible over a public network such as the Internet. Communications with endpoints outside CSPI 200 may be performed over public networks (e.g., the Internet) (not shown in FIG. 2) or private networks (not shown in FIG. 2) using various communication protocols.

The architecture of CSPI 200 depicted in FIG. 2 is merely an example and is not intended to be limiting. Variations, alternatives, and modifications are possible in alternative embodiments. For example, in some implementations, CSPI 200 may have more or fewer systems or components than those shown in FIG. 2, may combine two or more systems, or may have a different configuration or arrangement of systems. The systems, subsystems, and other components depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 4:
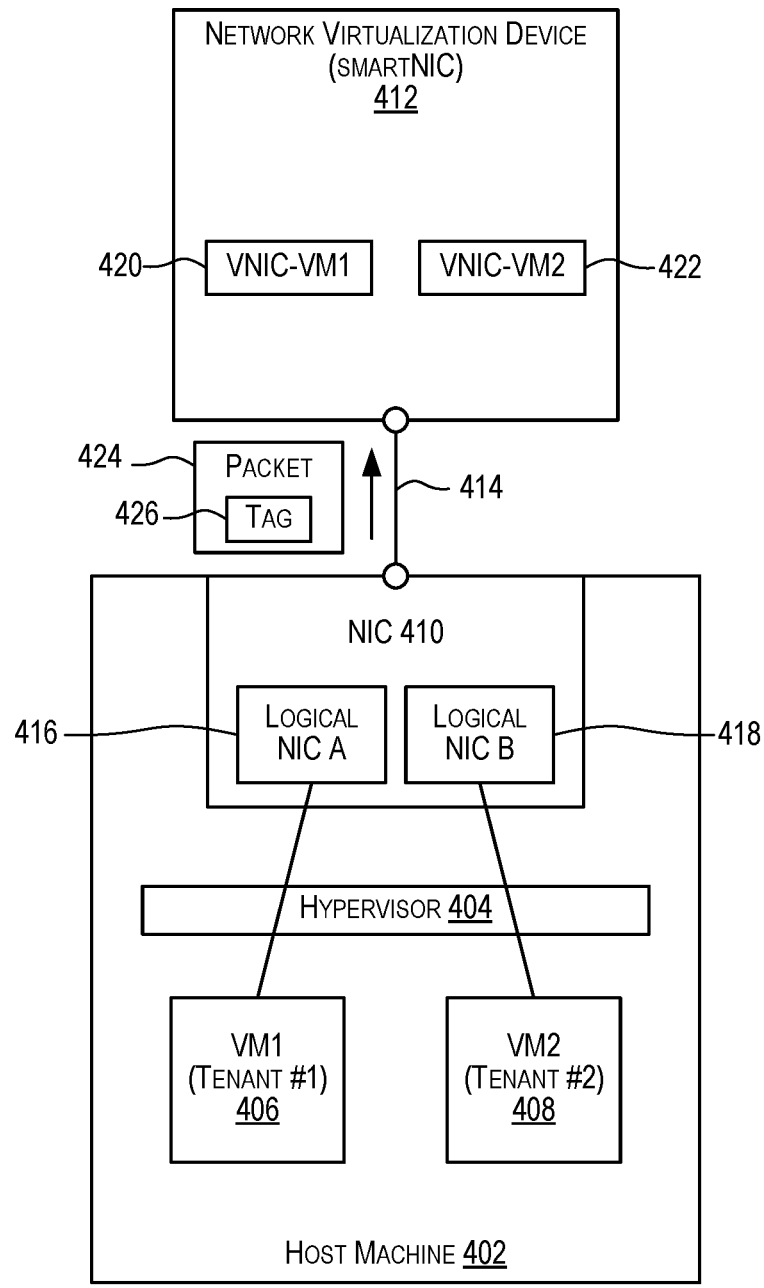
FIG. 4 depicts connectivity between a host machine and an NVD for providing I/O virtualization for supporting multitenancy according to certain embodiments.

FIG. 4 depicts connectivity between a host machine and an NVD for providing I/O virtualization for supporting multitenancy according to certain embodiments. As depicted in FIG. 4, host machine 402 executes a hypervisor 404 that provides a virtualized environment. Host machine 402 executes two virtual machine instances, VM1 406 belonging to customer/tenant #1 and VM2 408 belonging to customer/tenant #2. Host machine 402 comprises a physical NIC 410 that is connected to an NVD 412 via link 414. Each of the compute instances is attached to a VNIC that is executed by NVD 412. In the embodiment in FIG. 4, VM1 406 is attached to VNIC-VM1 420 and VM2 408 is attached to VNIC-VM2 422.

As shown in FIG. 4, NIC 410 comprises two logical NICs, logical NIC A 416 and logical NIC B 418. Each virtual machine is attached to and configured to work with its own logical NIC. For example, VM1 406 is attached to logical NIC A 416 and VM2 408 is attached to logical NIC B 418. Even though host machine 402 comprises only one physical NIC 410 that is shared by the multiple tenants, due to the logical NICs, each tenant's virtual machine believes they have their own host machine and NIC.

In certain embodiments, each logical NIC is assigned its own VLAN ID. Thus, a specific VLAN ID is assigned to logical NIC A 416 for Tenant #1 and a separate VLAN ID is assigned to logical NIC B 418 for Tenant #2. When a packet is communicated from VM1 406, a tag assigned to Tenant #1 is attached to the packet by the hypervisor and the packet is then communicated from host machine 402 to NVD 412 over link 414. In a similar manner, when a packet is communicated from VM2 408, a tag assigned to Tenant #2 is attached to the packet by the hypervisor and the packet is then communicated from host machine 402 to NVD 412 over link 414. Accordingly, a packet 424 communicated from host machine 402 to NVD 412 has an associated tag 426 that identifies a specific tenant and associated VM. On the NVD, for a packet 424 received from host machine 402, the tag 426 associated with the packet is used to determine whether the packet is to be processed by VNIC-VM1 420 or by VNIC-VM2 422. The packet is then processed by the corresponding VNIC. The configuration depicted in FIG. 4 enables each tenant's compute instance to believe that they own their own host machine and NIC. The setup depicted in FIG. 4 provides for I/O virtualization for supporting multitenancy.

FIG. 5 depicts a simplified block diagram of a physical network 500 according to certain embodiments. The embodiment depicted in FIG. 5 is structured as a Clos network. A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc. The embodiment depicted in FIG. 5 is a 3-tiered network comprising tiers 1, 2, and 3. The TOR switches 504 represent Tier-0 switches in the Clos network. One or more NVDs are connected to the TOR switches. Tier-0 switches are also referred to as edge devices of the physical network. The Tier-0 switches are connected to Tier-1 switches, which are also referred to as leaf switches. In the embodiment depicted in FIG. 5, a set of "n" Tier-0 TOR switches are connected to a set of "n" Tier-1 switches and together form a pod. Each Tier-0 switch in a pod is interconnected to all the Tier-1 switches in the pod, but there is no connectivity of switches between pods. In certain implementations, two pods are referred to as a block. Each block is served by or connected to a set of "n" Tier-2 switches (sometimes referred to as spine switches). There can be several blocks in the physical network topology. The Tier-2 switches are in turn connected to "n" Tier-3 switches (sometimes referred to as super-spine switches). Communication of packets over physical network 500 is typically performed using one or more Layer-3 communication protocols. Typically, all the layers of the physical network, except for the TORs layer are n-ways redundant thus allowing for high availability. Policies may be specified for pods and blocks to control the visibility of switches to each other in the physical network so as to enable scaling of the physical network.

A feature of a Clos network is that the maximum hop count to reach from one Tier-0 switch to another Tier-0 switch (or from an NVD connected to a Tier-0-switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The bandwidth/throughput capacity of the network can be easily increased by adding more switches at the various tiers (e.g., more leaf and spine switches) and by increasing the number of links between the switches at adjacent tiers.

In certain embodiments, each resource within CSPI is assigned a unique identifier called a Cloud Identifier (CID). This identifier is included as part of the resource's information and can be used to manage the resource, for example, via a Console or through APIs. An example syntax for a CID is:

ocid1.<RESOURCE TYPE>.<REALM>.[REGION][.FUTURE USE].<UNIQUE ID> where, ocid1: The literal string indicating the version of the CID;
resource type: The type of resource (for example, instance, volume, VCN, subnet, user, group, and so on);
realm: The realm the resource is in. Example values are "c1" for the commercial realm, "c2" for the Government Cloud realm, or "c3" for the Federal Government Cloud realm, etc. Each realm may have its own domain name;
region: The region the resource is in. If the region is not applicable to the resource, this part might be blank;
future use: Reserved for future use.
unique ID: The unique portion of the ID. The format may vary depending on the type of resource or service.

Packet Flow Control

Figure 6:
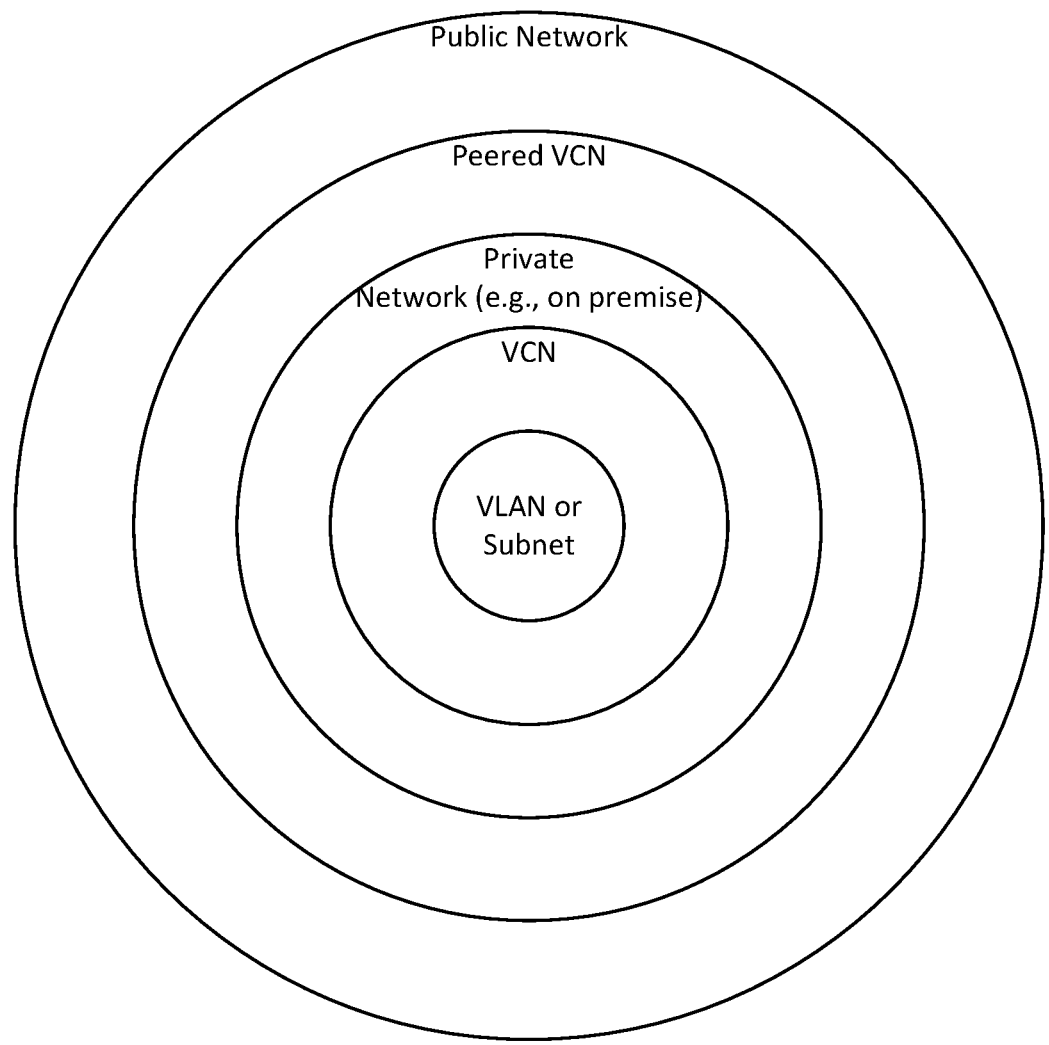
FIG. 6 illustrates an example of network boundaries according to certain embodiments.

FIG. 6 illustrates an example of network boundaries 600 according to certain embodiments. Generally, a network boundary can represent a logical construct and/or a physical construct of a boundary of a virtual and/or a substrate network, where the flow of packets within this boundary can be controlled. For example, a network boundary can correspond to a particular VCN or portion thereof that is hosted on a substrate network within a particular geographical region. Furthermore, a network boundary can be selected by a customer to control the packet flow from and/or to the customer's network(s). Even if multiple customers select the same network boundary, their selection is in effect specific to their configured networks and correspond to different logical and/or physical constructs. For example, if two customers select a VCN network boundary, their traffic flows are in effect controlled according to their respective VCNs.

In the illustration of FIG. 6, six network boundaries 600 are shown. A first network boundary corresponds to an L2 VLAN within a VCN of a customer. The customer can select this network boundary to indicate that packets (or, more accurately, frames) can flow between compute instances of the customer's L2 VLAN. A second boundary corresponds to an L3 subnet within the VCN. The customer can select this network boundary to indicate that packets can flow between compute instances of the customer's L2 subnet. The L2 VLAN network boundary and the L3 subnet network boundary are not mutually exclusive. Further, multiple L2 VLAN network boundaries and/or multiple L3 subnet network boundaries within the VCN can be selected by the customer.

A third network boundary corresponds to the VCN. The customer can select this network boundary to indicate that packets can flow between compute instances of the VCN. A fourth network boundary corresponds to a private network of the customer, such as an on-premise network. A selection of this network boundary expands the flow such that packets can be sent between the VCN and the private network. A fifth network boundary corresponds to a peered VCN of the customer (e.g., a second VCN peered with a first VCN that corresponds to the third network boundary). A selection of this network boundary expands the flow such that packets can be sent between the peered VCNs. A sixth network boundary corresponds to a public network, such as the Internet (e.g., a second VCN peered with a first VCN that corresponds to the third network boundary). The customer can select this network boundary to indicate that packets can flow between its compute instances and resources on the public network.

FIG. 6 illustrates a concentric distribution of the network boundaries 600 to indicate that a network boundary shown by a larger circle can include network boundary(ies) shown by the smaller circle(s). However, the embodiments of the present disclosure are not limited as such. Network boundaries can be inclusive, exclusive, or mutually exclusive. For example, the customer can select an L3 subnet network boundary and a peered VCN boundary. In this example, packet flows are permitted between compute instances of the L3 subnet and between compute instances of the L3 subnet and compute instances of the peered VCN. However, packet flows are prohibited between the compute instances of the L3 subnet and other compute instances of the VCN.

Figure 7:
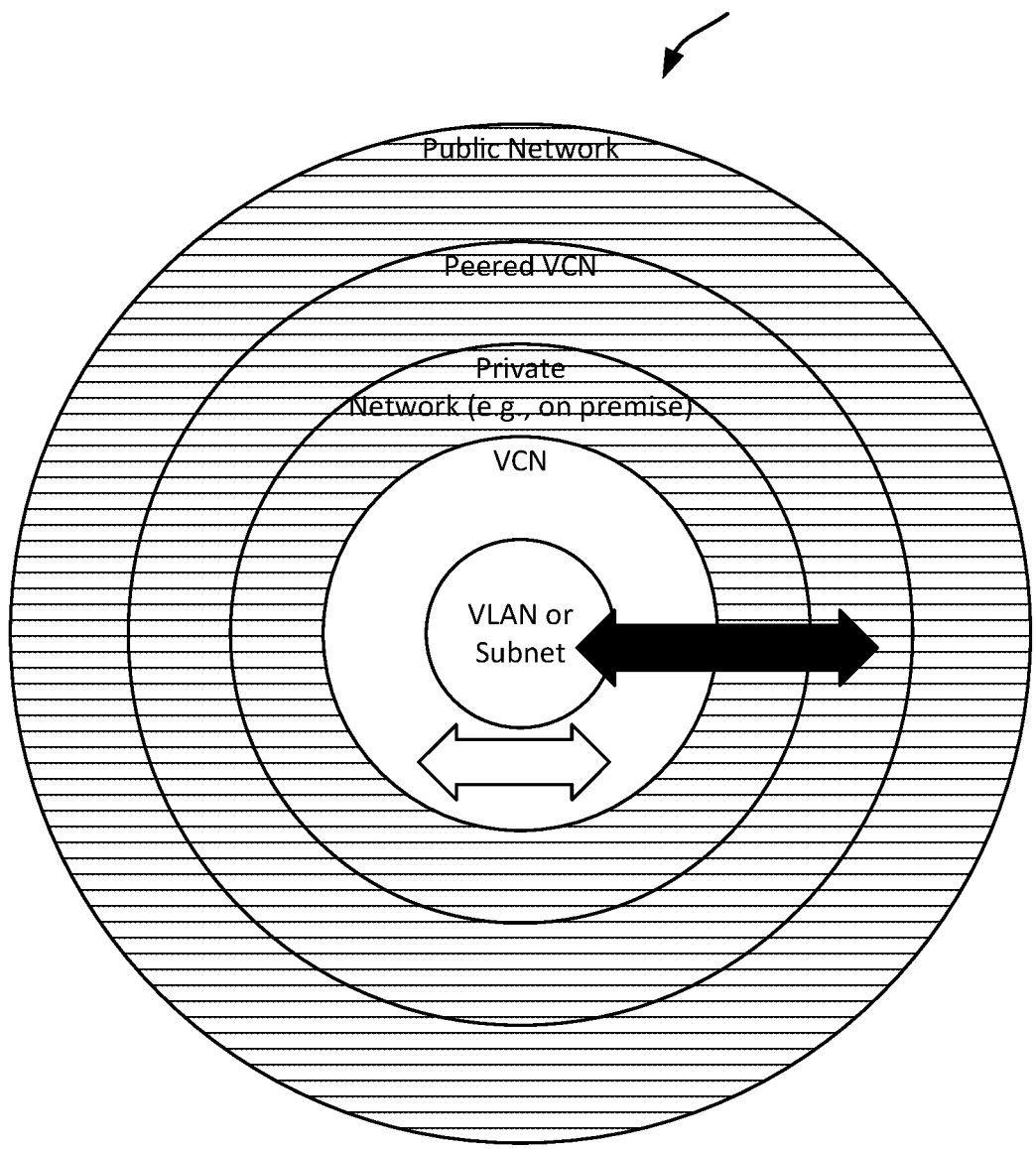
FIG. 7 illustrates an example of packet flow rules according to certain embodiments.

FIG. 7 illustrates an example of packet flow rules 700 according to certain embodiments. Generally, upon a customer selection of a set of network boundaries, a packet flow rule can be generated specifying that packet flows within the selected set are permitted, and are otherwise prohibited. The packet flow rule can be used to generate scoping data, where this scoping data indicates the permitted network boundary(ies) and/or prohibited network boundary(ies). The customer's selection can be granular to a specific compute instance within a selected network boundary. The selection can be global to all compute instances within a selected network boundary or the selection can be at any resolution level between the two. Regardless, a packet flow rule can be generated per compute instance to which it applies.

In the illustration of FIG. 7, the customer has selected the VCN network boundary. This selection is shown by marking the outer network boundaries (e.g., the ones corresponding to private network, peered VCN, and public network) with horizontal lines/pattern. Of course other selections are possible and result in different packet flow rules. Given the illustrated selection, the packet flow rules 700 indicate a permitted egress/ingress flow 710 between any computing instances within the VCN and a prohibited egress/ingress flow 720 between a compute instance within the VCN and a resource outside of the VCN (e.g., the resource is not a compute instance hosted in the VCN).

As explained herein above, a packet flow rule can be defined per compute instance of the VCN. This packet flow rule may control the ingress and egress flows in the same manner. However, the embodiments of the present disclosure are not limited as such. In particular, the ingress and egress flows can be controlled differently. For instance, a first packet flow rule can be generated for a compute instance of a VCN to indicate that packets sent from the compute instance can cross a certain network boundary (e.g., the compute instance can send packets to a compute instance in a peered VCN). A second packet flow rule can be generated for the compute instance to indicate that packets sent to the compute instance can be dropped when they originate from outside a certain network boundary (e.g., the compute instance receives packets from other compute instances within the VCN but not from compute instances within the peered VCN).

Figure 8:
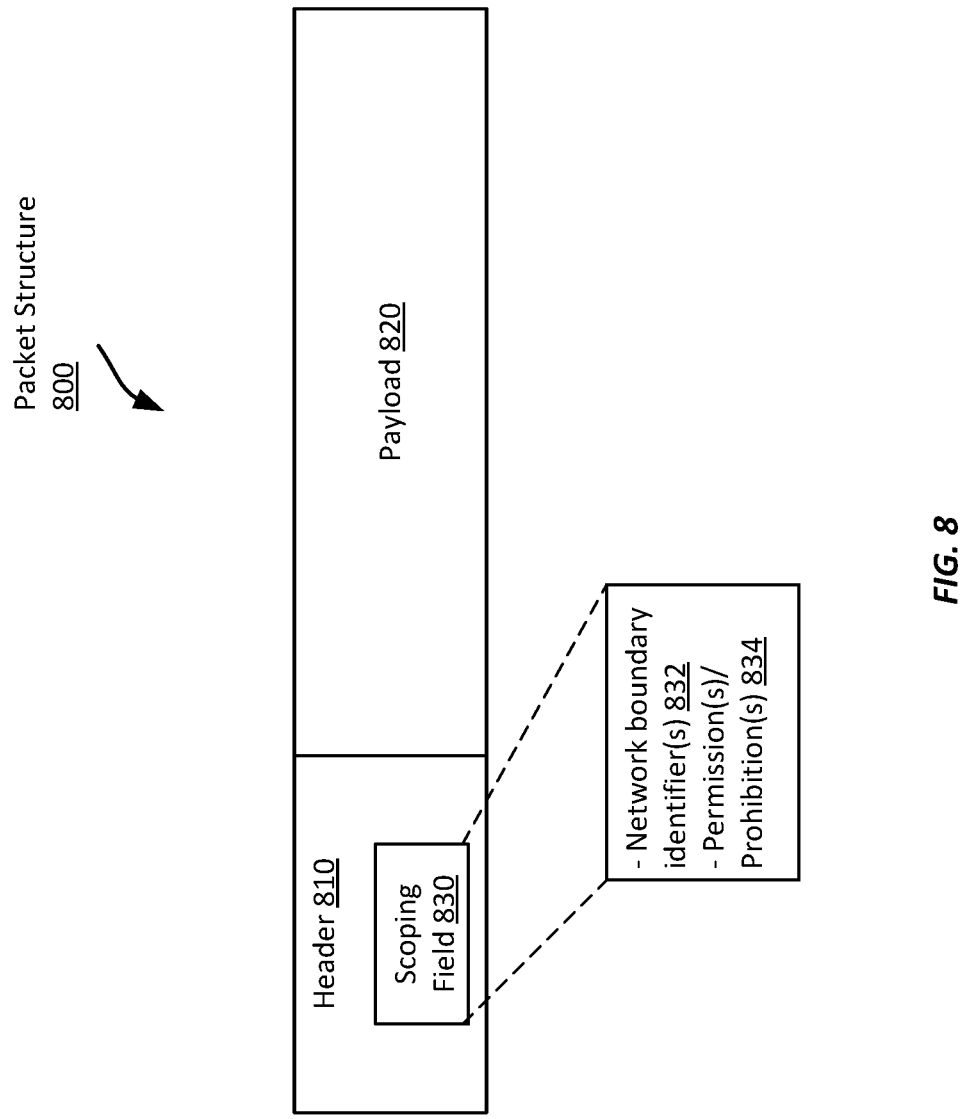
FIG. 8 illustrates an example of a packet structure that includes scoping data indicating a packet flow rule according to certain embodiments.

FIG. 8 illustrates an example of a packet structure 800 of a packet, where this structure 800 includes scoping data 830 indicating a packet flow rule according to certain embodiments. Generally, the scoping data 830 encodes the packet flow rule such that, as the packet flows along a network path, processing resources along this path can determine and enforce the packet rule based on the scoping data.

In an example, the packet structure 800 includes a header 810 and a payload 820. The header 810 is usable to determine how the packet is to be processed (e.g., by including a source address, a destination address, a protocol identifier, and/or encapsulation data among other information such that the packet can be routed between virtual networks or within a virtual network and via one or more substrate networks). The payload 820 includes the data that is sent from a source (e.g., from a compute instance within a virtual network).

The scoping data 830 indicates a scope of the packet's flow, such as what network boundary can the packet flow within, what network boundary can the packet cross, and/or what network boundary can the packet not cross. The scoping data 830 can be included as metadata in the header 810, where the metadata indicates that a flow within a network boundary is permitted and/or a flow within another network boundary is prohibited. For example and referring back to the illustration of FIG. 7, the metadata indicates that the packet can flow within the VCN. Additionally or alternatively, the metadata indicates that the packet cannot flow outside of the VCN.

In an example, the scoping data 830 is included as a field in the header 810, where this field indicates network boundary identifier(s) 832 and permission(s)/prohibitions 834 related to the network boundary identifier(s) 832. For instance, the field can be a byte long. A first bit (e.g., the most significant bit) can indicate whether the packet structure 800 supports or includes scoping data (e.g., set to "1" to indicate the support and to "0" otherwise). The remaining seven bits can be used to indicate the permitted network boundaries. In particular, $2^7$ selectable combinations of permitted network boundaries are possible. In another illustration, the bits in the field form a bit mask. Each bit in the bit mask corresponds to a network boundary and its binary value represents the permission or prohibition (e.g., "1" indicates permission, "0" indicated otherwise).

Figure 9:
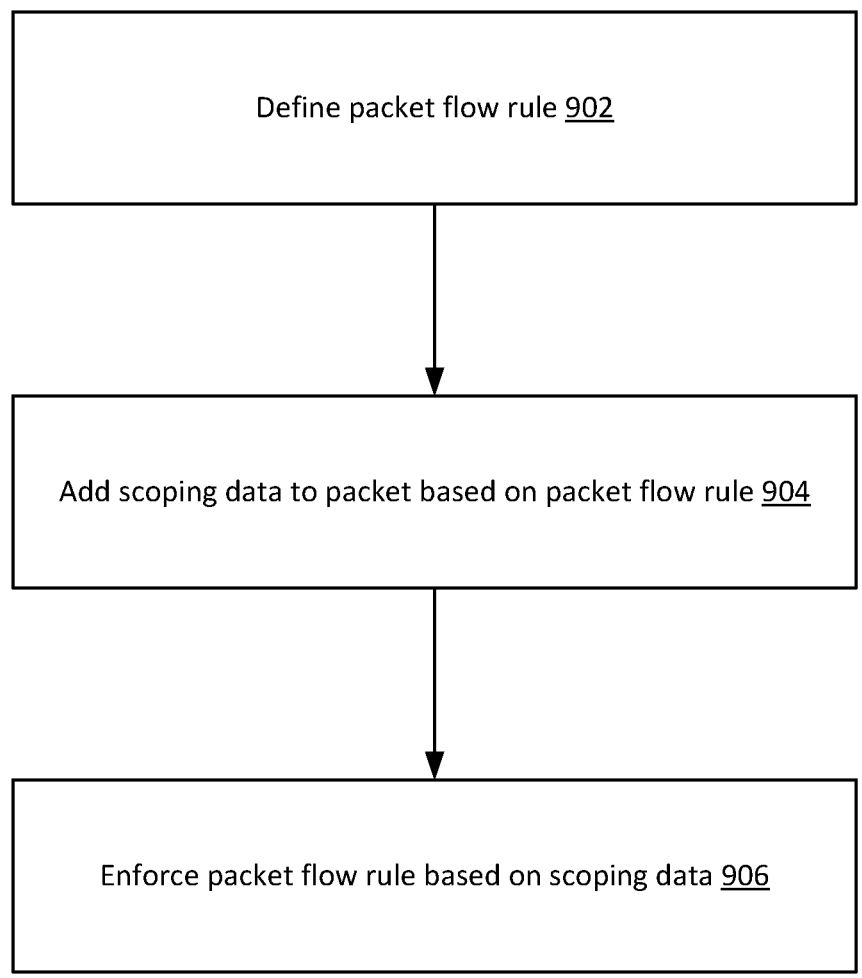
FIG. 9 illustrates an example of a method for controlling a packet flow according to certain embodiments.

FIG. 9 illustrates an example of a method for controlling a packet flow according to certain embodiments. The method includes, at operation 902, defining a packet flow rule. The packet flow rule can depend on a selection of a network boundary from multiple network boundaries available to the customer, where the network boundaries can be similar to the ones described in FIGS. 6-7. The definition of the network packet rule reflects the customer's selection, as further illustrated in FIGS. 10-11. The method also includes, at operation 904, adding scoping data to a packet generated by a compute instance based on a packet flow rule defined for the compute instance. The packet can have a packet structure such as the one illustrated in FIG. 8. The scoping data can be included in a header of the packet, as further described in FIGS. 12-13. The method also includes, at operation 906, enforcing the packet rule based on the scoping data. A processing resource can receive the packet, extract the scoping data, identify the permitted network boundary(ies) based on the scoping data, determine whether the packet can be sent (e.g., if its destination or the next hop is within the permitted network boundary(ies)), and send or drop the packet based on the determination, as further described in FIGS. 14-16.

Figure 10:
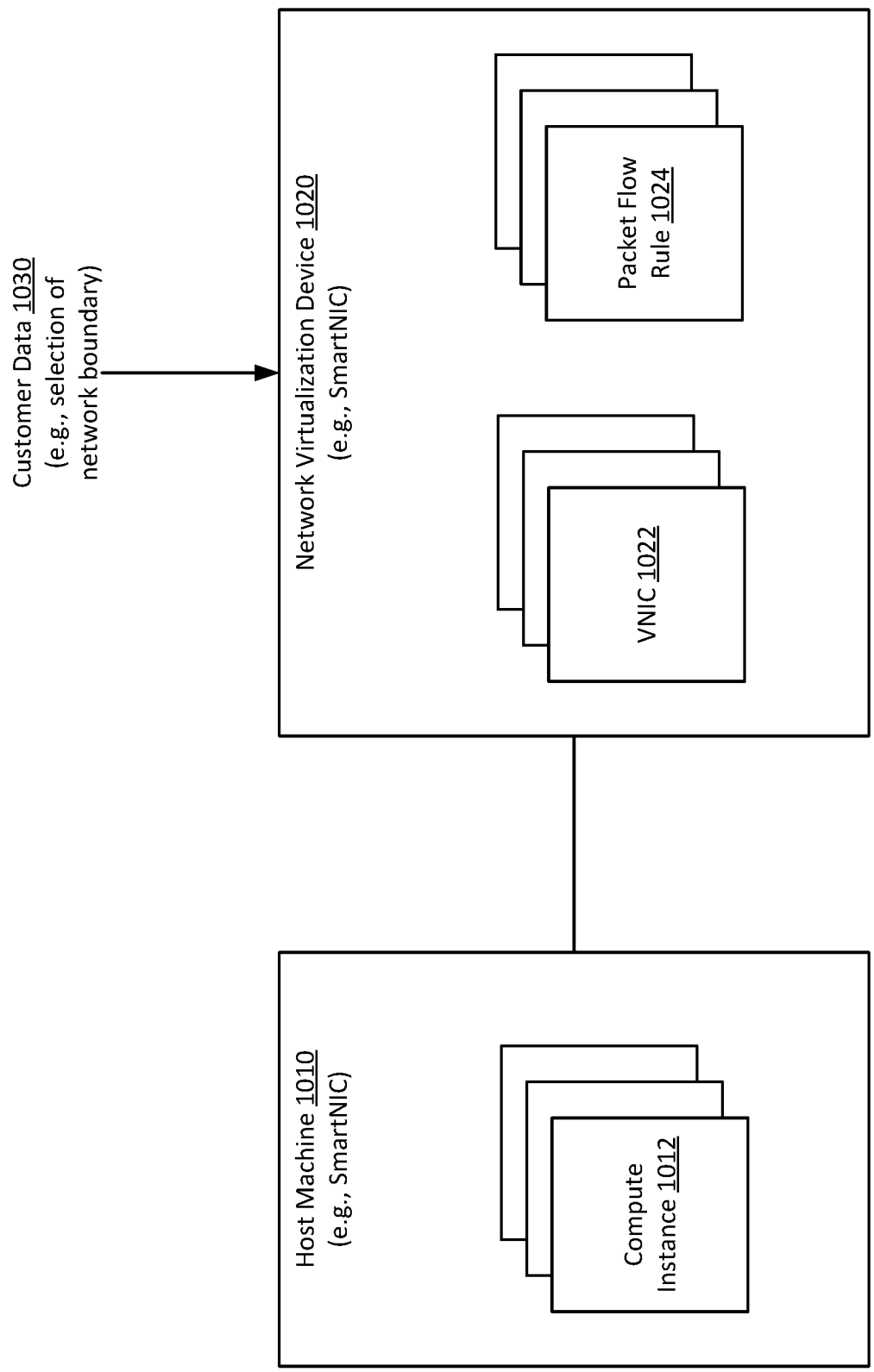
FIG. 10 illustrates an example of a system for generating a packet flow rule according to certain embodiments.

FIG. 10 illustrates an example of a system for generating a packet flow rule according to certain embodiments. As illustrated, the system includes a host machine 1010 and an NVD 1020, such as a smartNIC. The NVD 1020 receives customer data 1030 from a control plane (not shown), where the customer data 1030 indicates a selection of a set of network boundaries for controlling packet flows. The NVD 1020 generates and stores packet flow rules based on the customer data 1030.

Generally, the host machine 1010 hosts one or more compute instances 1012 of a customer and is connected with the NVD 120. The connection can be an Ethernet link. The NVD 120 hosts, among other virtual functions, one or more VNICs 1022, each of which is associated with one of the compute instances 1012 and provides virtual network interface functions to the compute instance. The virtual network interface functions include providing an interface to a virtual network.

In an example, the control plane receives input of the customer via an application programing interface (API) or some other means. The input indicates a selection of a network boundary within which packet flows are permitted. The selection can be specific to one of the compute instances 1012, can be generic to all compute instances 1012, or can indicate a subset of the compute instances 1012. In all three cases, the control plane sends the customer data 1030 to the NVD 1020 indicating the network boundary and the compute instance(s) to which the customer data 1030 applies. The customer data 103 can be sent as a configuration file. In turn, the NVD 1020 determines the affected compute instance(s). For each affected compute instance, the NVD 1020 generates a packet flow rule 1024 indicating the permitted network boundary and/or a prohibited network boundary. For instance the packet flow rule 1024 identifies a network boundary and the permission or prohibition related thereto. The NVD 1020 also determines the VNIC that is associated with the compute instance and stores, in association with the VNIC, the packet flow rule 1024. For instance, the packet flow rule 1024 is stored in a cache usable by the VNIC. Of course, multiple packet flow rules can be similarly generated and stored, one for each affected compute instance. In addition, each packet flow rule can indicate multiple permitted network boundaries and/or multiple prohibited network boundaries.

Although FIG. 10 illustrates that an NVD that is directly connected to a host machine generates a packet flow rule for a compute instance of the host machine, other devices may additionally or alternatively be used to generate such a packet flow rule. Such devices need not be directly connected to the host machine. For instance, and referring back to FIG. 10, the NVD 1020 may host a lightweight version of a VNIC and may be connected, via a tunnel or some other peering mechanism, to a server fleet. The server fleet can be a set or an enclave of servers or host machines that hosts a network interface service for one or more customers, where this service provides network interface functions for connectivity between computer instances. In one example, the network interface service can be a VNIC as a service (VNICaaS). In this example, the network interface service includes multiple VNICS and these VNICs can be referred to as service VNICs (as opposed to micro-VNICs). Typically a service VNIC can be associated with multiple micro-VNICs, each of which is in turn associated with a single compute instance. In other words, a service VNIC can be associated with multiple compute instances through their corresponding micro-VNICs and can provide virtual network interface functions to these compute instances. The virtual network interface functions include providing an interface of a compute instance to a virtual network. In this example, the server fleet (e.g., one or more of the servers) can generate a packet flow rule for a compute instance and can store the packet flow for use by a service VNIC associated with the compute instance.

Figure 11:
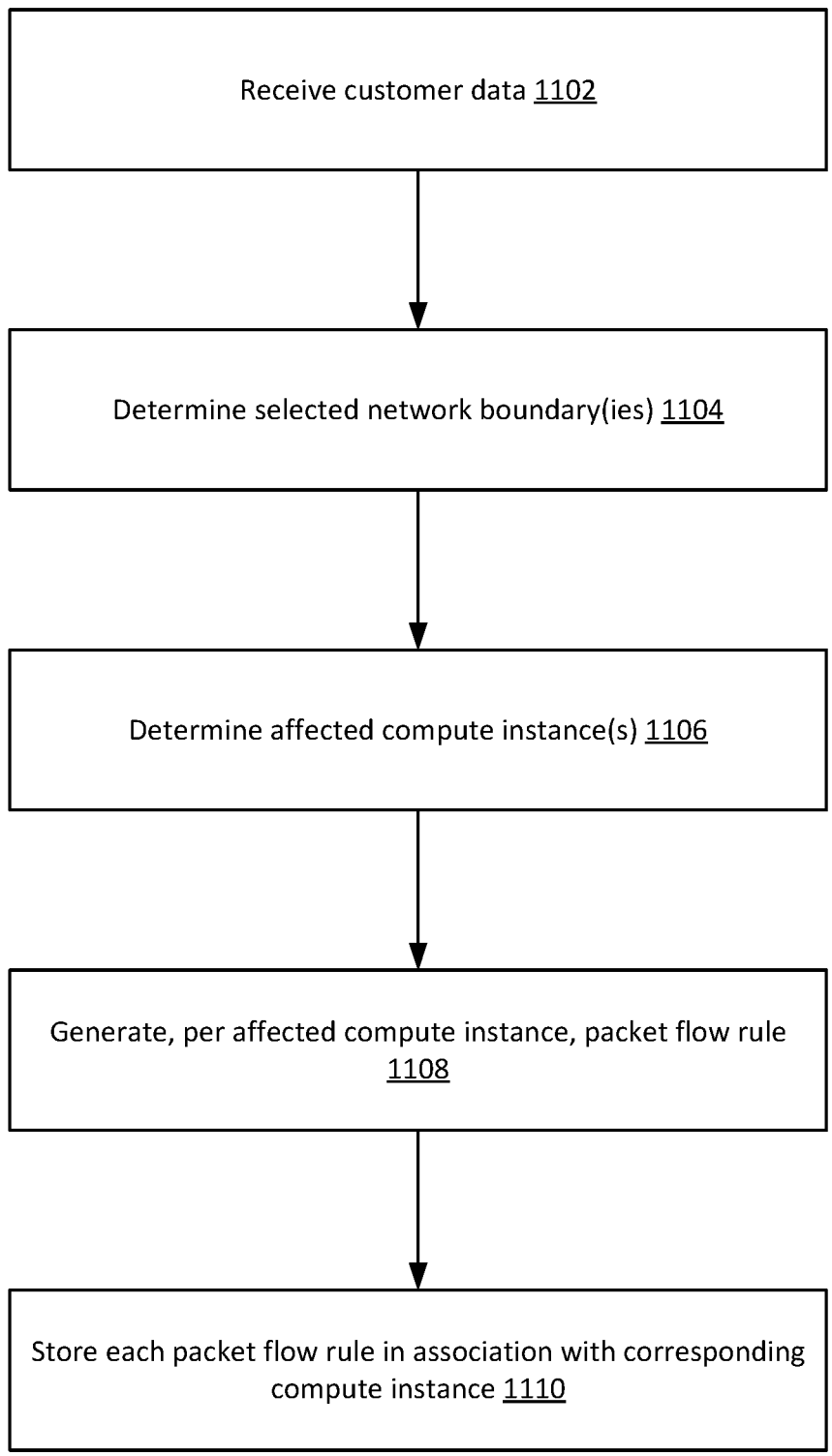
FIG. 11 illustrates an example of a method for generating a packet flow rule according to certain embodiments.

FIG. 11 illustrates an example of a method for generating a packet flow rule according to certain embodiments. Operations of the method are illustrated as being performed by a network virtualization device. This device can be similar to the NVD 1020 of FIG. 10, a server fleet that provides a network interface service, or another device of a cloud infrastructure that provides virtualization services (e.g., a router, a gateway, a switch, a load balancer, etc.). Some or all of the instructions for performing the operations can be implemented as hardware circuitry and/or stored as computer-readable instructions on a non-transitory computer-readable medium of the network virtualization device. As implemented, the instructions represent modules that include circuitry or code executable by processors of the network virtualization device. The use of such instructions configures the network virtualization device to perform the specific operations described herein. Each circuitry or code in combination with the relevant processor(s) represents a means for performing a respective operation(s). While the operations are illustrated in a particular order, it should be understood that no particular order is necessary and that one or more operations may be omitted, skipped, performed in parallel, and/or reordered.

In an example, the method starts at operation 1102, where the network virtualization device receives customer data 1102. For instance, the customer data 1102 is received from a control plane and indicates a customer's selection of a network boundary to use for controlling packet flows (or multiple selected network boundaries as described in FIG.). At operation 1104, the network virtualization device determines a selected network boundary(ies). For instance, the selected network boundary(ies) is identified from the customer data, where the customer data indicates that the packet flow is permitted within the boundary(ies) and/or prohibited within other network boundary(ies). At operation, 1106, the network virtualization device determines the affected customer instance(s). The customer's selection may be applicable more than the compute instance. If so, the customer data indicates the affected customer instances. Otherwise, the customer data indicates the only affected customer instance. At operation 1108, the network virtualization device generates, per affected compute instance, a packet flow rule. The packet flow generated for a compute indicates how the packet flows from or to the compute instance are to be controlled given the permitted and/or prohibited network boundary(ies). At operation 1110, the network virtualization device stores each packet flow rule associated with the corresponding compute instance. For instance, the network virtualization device may host a VNIC that is associated with a compute instance. The packet flow rule corresponding to the compute instance can be stored in a cache usable by the VNIC.

Figure 12:
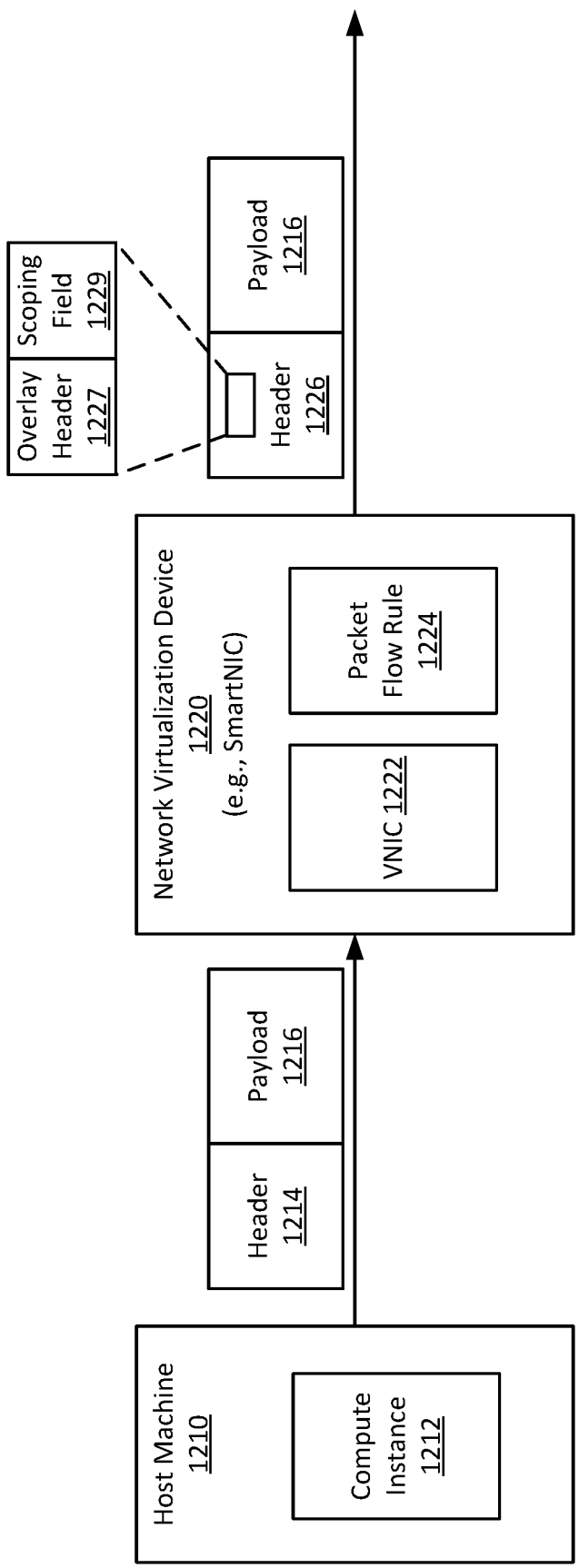
FIG. 12 illustrates an example of a system for generating a packet that includes data indicating a packet flow rule according to certain embodiments.

FIG. 12 illustrates an example of a system for generating a packet that includes data indicating a packet flow rule according to certain embodiments. The system includes a host machine 1210 and an NVD 1220 similar to the host machine 1010 and NVD 1020, respectively, of FIG. 10. The host machine 1210 hosts a compute instance 1212 of a customer, whereas the NVD 1220 hosts a VNIC 1222 associated with the compute instance 1212, and stores a packet flow rule 1224 usable to control the packet flow from the compute instance 1212.

In operation, the compute instance 1212 sends a packet that includes a header 1214 and a payload 1216. The packet is sent over the link (e.g., Ethernet link) from the host machine 1210 to the NVD 1220. The NVD 1220 determines, from the header 1214, that this packet is sent from the compute instance 1212. In an example, the NVD 1220 also determines from the packet flow rule 1224 the permitted network boundary(ies) and/or prohibited network boundary(ies) for the flow of the packet from the compute instance 1212. If the flow is permitted, the NVD 1220 generates scoping data indicating the scope of the flow. Otherwise, the NVD 1220 drops the packet. In another example, the VNIC 1222 performs this determination and, as applicable, generates the scoping data. In both examples, the scoping data is included in an updated header 1226 of the packet. The NVD 1220 outputs the packet with the updated header 1226 and the payload 1216 onto a substrate network, whereby the updated header 1226 further includes encapsulation data for sending the packet through the substrate network. As illustrated in FIG. 12, the updated header 1126 includes an overlay header 1227 and a scoping field 1229. The overlay header 1227 includes the encapsulation data. The scoping field 1129 includes the scoping data in a similar way as the description of the scoping data 830 in FIG. 8.

To illustrate, consider a first example, where the compute instance 1212 is within a VCN of the customer, and where the packet flow rule 1224 permits the flow of packets from the compute instance 1212 to any other compute instance within the VCN only. The NVD 1120 receives the packet of the compute instance and determines, using a VCN mapping table, that a destination tunnel endpoint is within the permitted network boundary. Accordingly, the NVD 1220 adds the scoping data and other encapsulation data to the packet and sends the packet forward.

To illustrate, consider a first example, where the compute instance 1212 is within a VCN of the customer, and where the packet flow rule 1224 permits the flow of packets from the compute instance 1212 to any other compute instance within the VCN only. In this example, the compute instance 1212 sends a packet destined to a compute instance within the VCN. The NVD 1220 receives and determines, using a VCN mapping table, that a destination tunnel endpoint is within the permitted network boundary. Accordingly, the NVD 1220 adds the scoping data and other encapsulation data to the packet and sends the packet forward.

In a second example, the packet flow rule 1124 also permits the flow of packets to the VCN only, but the compute instance 1212 sends a packet destined to a resource outside of the VCN. In this example, the NVD 1220 receives and determines, using the VCN mapping table, that a destination tunnel endpoint is outside of the permitted network boundary. Accordingly, the NVD 1220 drops the packet.

In a third example, the packet flow rule 1124 permits the flow of packets to an on-premise network of the customer, where a DRG couples the VCN with the on-premise network. In this example, a packet is destined to an endpoint within the on-premise network. The NVD 1220 receives and determines, using a VCN mapping table, that the destination is outside of the VCN. Next, the NVD 1220 determines, using a routing table, that the packet is to be sent to the DRG. Because the DRG is within the permitted network boundary, the NVD 1220 adds the scoping data and other encapsulation data to the packet and sends the packet forward.

In FIG. 12, a NVD that is directly coupled with a host machine (e.g., a SmartNIC) generates and adds scoping data to a packet based on a packet flow rule. However, the embodiments are not limited to this type of NVDs. Instead, the embodiments similarly apply to other devices of the substrate network or a virtual network, such as to a server fleet that provides a network interface service (e.g., VNI-CaaS), a router, a switch, a gateway, load balancer, and the like. For instance, an NVD of the service fleet may receive a packet of the compute instance 1212 from the NVD 1220 and may, in turn, determine the applicable packet flow rule and either drop the packet or generate and add the relevant scoping data. In another illustration, an ingress packet may be received by, for instance, a router and may not include scoping data. The router may determine that the packet is destined to a compute instance and may add scoping data based on a packet flow rule applicable to the compute instance.

Figure 13:
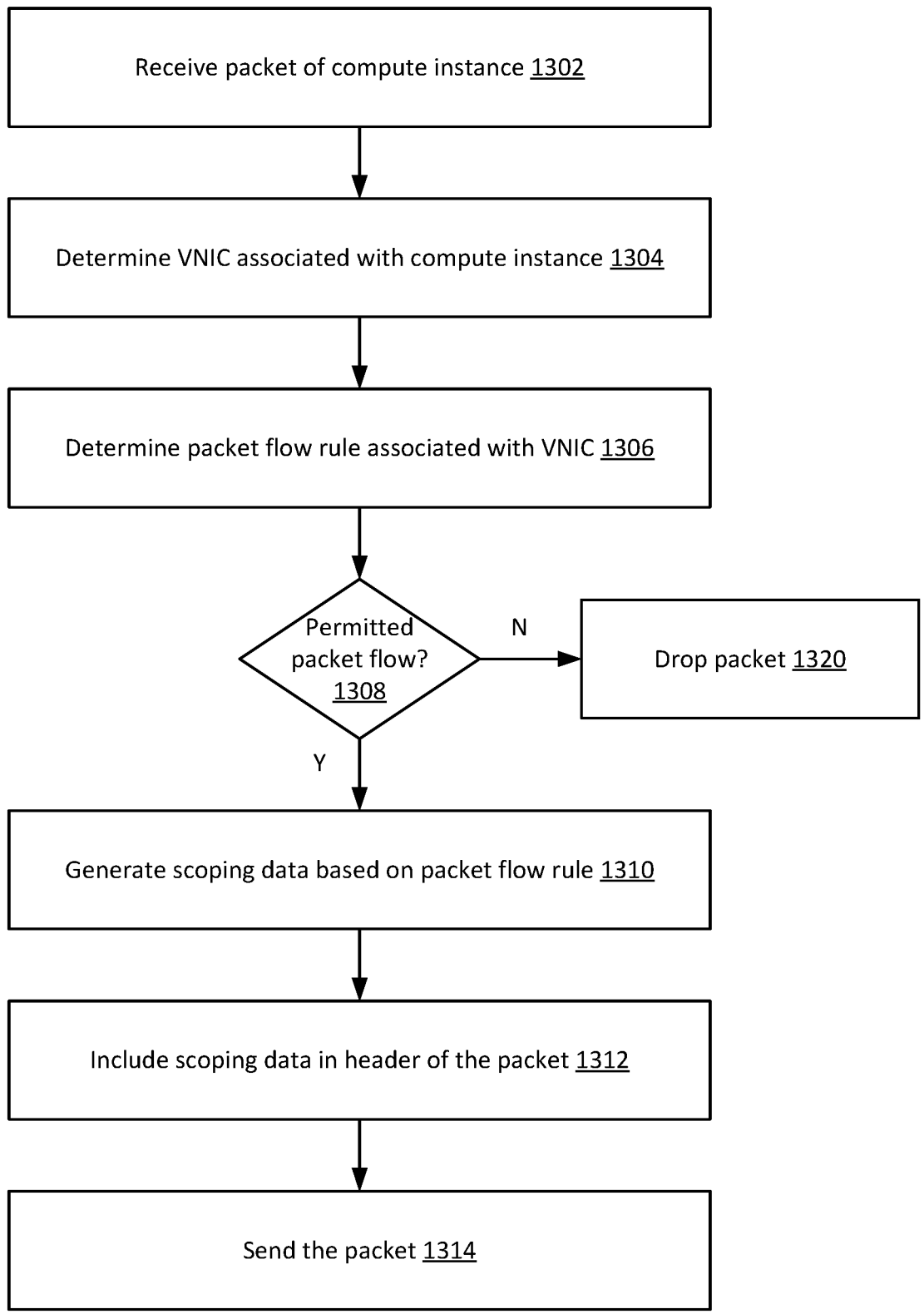
FIG. 13 illustrates an example of a method for generating a packet that includes data indicating a packet flow according to certain embodiments.

FIG. 13 illustrates an example of a method for generating a packet that includes data indicating a packet flow according to certain embodiments. Operations of the method are illustrated as being performed by a network virtualization device. This device can be similar to the NVD 1220 of FIG. 12, a server fleet that provides a network interface service, or another device of a cloud infrastructure that provides virtualization services (e.g., a router, a gateway, a switch, a load balancer, etc.). Some or all of the instructions for performing the operations can be implemented as hardware circuitry and/or stored as computer-readable instructions on a non-transitory computer-readable medium of the network virtualization device. As implemented, the instructions represent modules that include circuitry or code executable by processors of the network virtualization device. The use of such instructions configures the network virtualization device to perform the specific operations described herein. Each circuitry or code in combination with the relevant processor(s) represents a means for performing a respective operation(s). While the operations are illustrated in a particular order, it should be understood that no particular order is necessary and that one or more operations may be omitted, skipped, performed in parallel, and/or reordered.

In an example, the method starts at operation 1302, where the network virtualization device receives a packet of a compute instance. For instance, the packet is generated by the compute instance, is sent by a host machine of the compute instance, and is received by the NVD over a link with the host machine. At operation 1304, the network virtualization device determines a VNIC that is associated with the compute instance. For instance, the network virtualization device identifies the compute instance based on a source address in the header of the packet and identifies, from a plurality of VNICs hosted by the network virtualization device, the VNIC that is associated with the compute instance. At operation 1306, the network virtualization device determines a packet flow rule associated with the VNIC. For instance, the packet flow rule is stored in the cache of the VNIC 1 and indicates a permitted network boundary(ies) and/or a prohibited network boundary(ies) for packet flows from the compute instance. At operation 1308, the network virtualization device determines whether the flow of the packet is permitted or prohibited. For instance, using mapping tables, routing tables, and/or other configuration information of a substrate network and/or virtual network, the network virtualization device determines whether a destination of the packet is within a permitted boundary. The destination may be the addressed destination in the packet or a next hop destination. If permitted, the operation 1310 follows operation 1308. Otherwise, operation 1320 is performed, where the network virtualization device drops the packet. At operation 1310, the network virtualization device generates scoping data based on the packet flow rule. For instance, the scoping data can indicate the network boundary(ies) and the related permission(s)/prohibition(s). At operation 1312, the network virtualization device includes the scoping data in the header of the packet. For instance, the scoping data are added as bits in a scoping field, within the header as described in FIG. 8. At operation 1314, the network virtualization device sends the packet. For instance, the network virtualization device further encapsulates the packet and sends the encapsulated packet on the substrate network.

Figure 14:
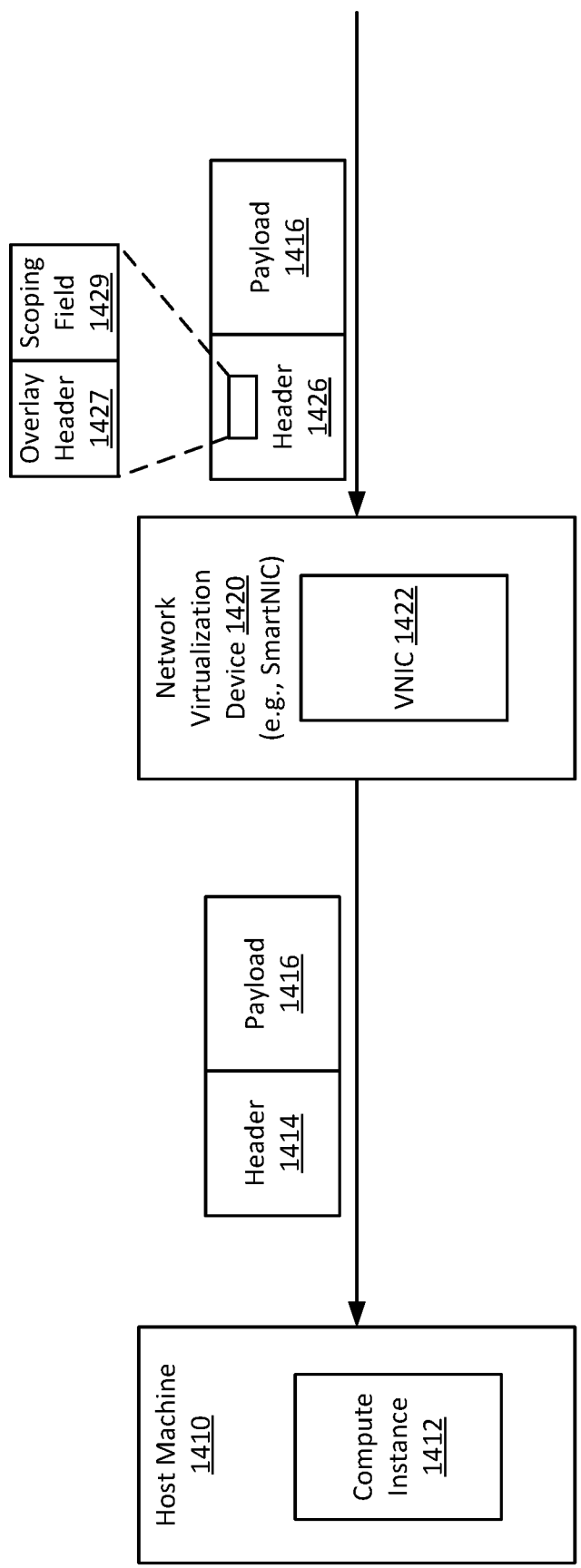
FIG. 14 illustrates an example of a system for enforcing a packet flow rule indicated in scoping data of a packet according to certain embodiments.

FIG. 14 illustrates an example of a system for enforcing a packet flow rule indicated in scoping data of a packet according to certain embodiments. The system includes a host machine 1410 and an NVD 1420 similar to the host machine 1010 and NVD 1020, respectively, of FIG. 10. The host machine 1410 hosts a compute instance 1412 of a customer, whereas the NVD 1420 hosts a VNIC 1422 associated with the compute instance 1412. In the example of FIG. 14, the packet flow is ingress, where the packet is received by the network virtualization device 1420 and a decision is made as to whether the packet is to be sent to the compute instance 1412.

In operation, the NVD 1420 receives the packet from a substrate network (e.g., from a switch of the substrate network). In an example, the packet has a similar structure as the packet structure 800 and includes a header 1426 and a payload 1416. The header 1426 encapsulates an overlay header 1427 (for the flow of the packet on the substrate network) and a scoping field 1429 that encodes the scoping data. The scoping data indicates a network boundary(ies) within which the packet is permitted or prohibited to flow. Based on a determination that the destination of the packet is the compute instance 1412, the NVD 1420 (or, similarly, the VNIC) determines whether the compute instance 1412 falls within a permitted network boundary. If not, the packet is dropped. Otherwise, the header 1426 is updated (shown in FIG. 14 as an updated header 1414), where the update includes removing the overlay header 1427 and the scoping field 1429. The packet (including the updated header 1414 and the payload 1416) is sent to the compute instance 1412 via the host machine 1410.

To illustrate, consider a first example of the compute instance 1412 being within a VCN of the customer and the scoping data indicating that the packet can flow within the VCN. In this case, the NVD 1420 (or, similarly, the VNIC 1422) determines that the permitted network boundary corresponds to the VCN and, accordingly, sends the packet to the compute instance 1412. In a second example, the compute instance 1412 belongs to a first L3 subnet of the VCN. In this example, the scoping data indicates that the packet can flow to a second L3 subnet of the VCN only. Here, the NVD 1420 (or, similarly, the VNIC 1422) determines that the permitted network boundary excludes the first L3 subnet, and, accordingly, drops the packet.

In FIG. 14, a NVD that is directly coupled with a host machine (e.g., a SmartNIC) uses scoping data to enforce a packet flow rule before a packet is sent to a compute instance of the host machine. However, the embodiments are not limited to ingress traffic and this type of NVD. Instead, the embodiments similarly apply to egress traffic and/or other devices of the substrate network or a virtual network as further described in FIG. 15.

Figure 15:
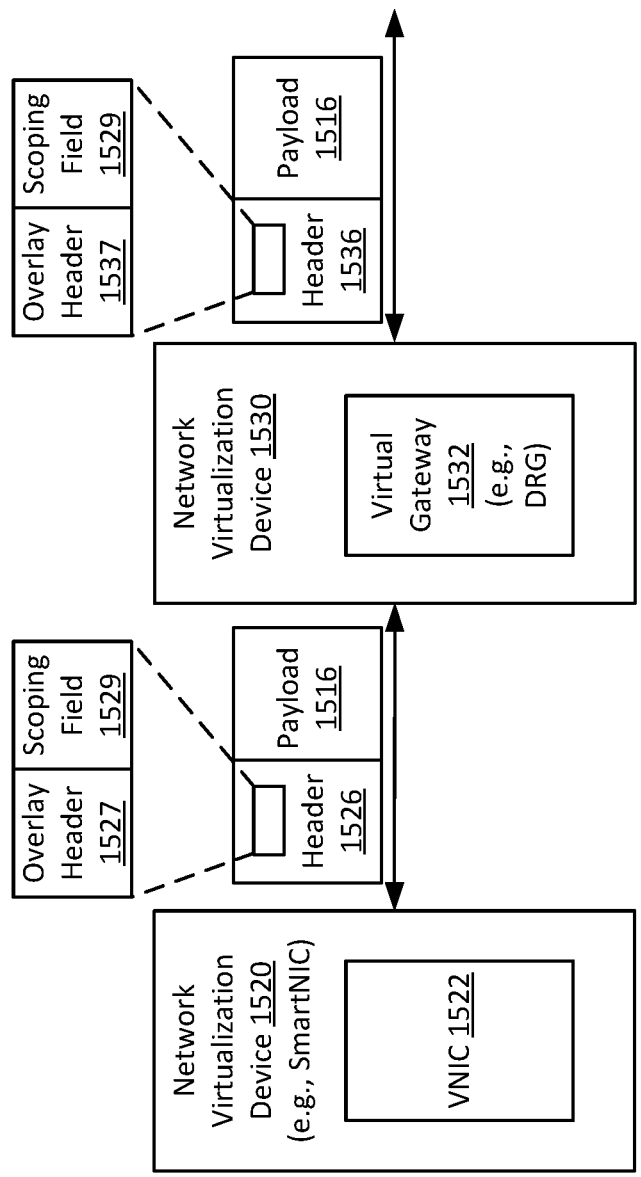
FIG. 15 illustrates another example of a system for enforcing a packet flow rule indicated in scoping data of a packet according to certain embodiments.

FIG. 15 illustrates another example of a system for enforcing a packet flow rule indicated in scoping data of a packet according to certain embodiments. The system includes a first NVD 1520 and a second NVD 1530 coupled via a substrate network. In the interest of clarity of explanation, a packet flow is described, where a packet is sent from the first NVD 1520 to the second NVD 1530. However, the packet flow can be in the opposite direction as indicated by the double arrows in FIG. 15.

In an example, the first NVD 1520 hosts a VNIC 1522 associated with a compute instance of a customer (e.g., the NVD 1520 is a SmartNIC). The compute machine belongs to a VCN of the customer and is executing on a host machine, where the host machine is coupled with the first NVD 1520 via the substrate network. The second NVD 1530 hosts a virtual gateway 1532 (e.g., a DRG) that couples the customer's VCN to another network (e.g., another peered VCN, an on-premise network, and/or or a public network). The VNIC 1522 and the virtual gateway 1532 are described herein for illustrative purposes only and the embodiments of the present disclosure are not limited as such. Instead, the embodiments similarly apply to any other virtual network functions that can be hosted on the first NVD 1520 and/or the second NVD 1530, such as a router, a switch, a load balancer, and the like.

In operation, the first NVD 1520 sends a packet to the second NVD 1530 via the substrate network (or, similarly, the VNIC 1522 sends the packet to the virtual gateway via a virtual network). The packet has a packet structure similar to the packet structure 800 of FIG. 8 and includes a header 1526 and a payload 1516. The header 1526 encapsulates an overlay header 1527 (for the flow of the packet on the substrate network) and a scoping field 1529 that encodes the scoping data. The scoping data indicates a network boundary(ies) within which the packet is permitted or prohibited to flow. In turn, the second NVD 1530 receives and processes the packet. The processing includes, among other things, extracting the scoping data from the scoping field 1529 and determining, based on the extracted scoping data, the permitted and/or prohibited network boundary(ies). Based on mapping tables, routing tables, and/or other network configuration information, the second NVD 1530 (or, similarly, the virtual gateway 1532) determines whether a destination of the packet is within a permitted boundary. The destination may be the addressed destination in the packet or a next hop destination. If prohibited, the second VND 1530 drops the packet. Otherwise, the second NVD 1530 sends the packet on the substrate network (or, similarly, the virtual gateway 1532 sends the packet on the virtual network). Here, the header 1526 may be updated (shown as an updated header 1536), where the update can include updates to the encapsulation data (e.g., an updated overlay header 1537) such that the packet can flow forward. The updated header 1536 may include the same scoping field 1529 (e.g., the scoping data is not updated), such that the scoping data can travel with the packet.

To illustrate, consider a first example, where the packet flow rule associated with the compute instance permits the flow of packets to a peered VCN of the customer, but not to an on-premise network of the customer, where a DRG hosted by the second NVD 1530 couples the VCN with the peered VCN and the on-premise network. In this example, the compute instance generates a packet that is destined to a second compute instance within the peered VCN. The first NVD 1220 receives the packet, updates its header to include the scoping data, and sends the packet to the second NVD 1530. In turn, the second NVD 1530 (or, similarly, the DRG) determines that the destination is within the peered VCN. Accordingly, the NVD 1530 (or, similarly, the DRG) sends the packet forward. In a second example, the compute instance generates a packet that is destined to an endpoint within the on-premise network. Here instead, upon receiving the packet from the first NVD 1520, the second NVD 1530 (or, similarly, the DRG) determines that the packet will flow outside the permitted network boundaries (e.g., the VCN and the peered VCN). Accordingly, the second NVD 1530 drops this packet.

Figure 16:
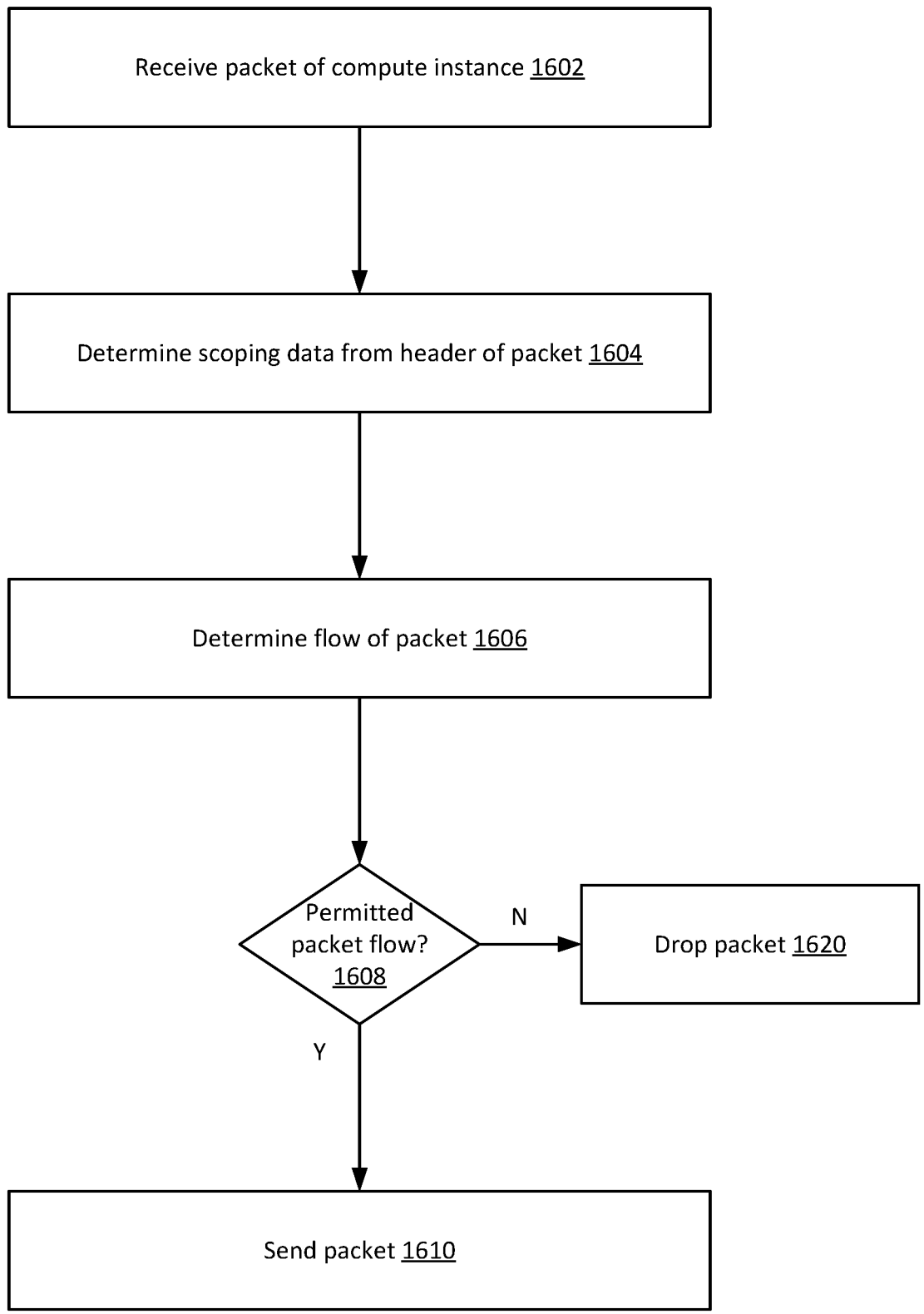
FIG. 16 illustrates an example of a method for enforcing a packet flow rule indicated in scoping data of a packet information according to certain embodiments.

FIG. 16 illustrates an example of a method for enforcing a packet flow rule indicated in scoping data of a packet information according to certain embodiments. Operations of the method are illustrated as being performed by a network virtualization device, such as the NVD 1520 or the NVD 1530 of FIG. 15. Some or all of the instructions for performing the operations can be implemented as hardware circuitry and/or stored as computer-readable instructions on a non-transitory computer-readable medium of the network virtualization device. As implemented, the instructions represent modules that include circuitry or code executable by processors of the network virtualization device. The use of such instructions configures the network virtualization device to perform the specific operations described herein. Each circuitry or code in combination with the relevant processor(s) represents a means for performing a respective operation(s). While the operations are illustrated in a particular order, it should be understood that no particular order is necessary and that one or more operations may be omitted, skipped, performed in parallel, and/or reordered.

In an example, the method starts at operation 1602, where the network virtualization device receives a packet of a compute instance. For instance, the packet is generated by the compute instance and is either received directly from the host machine of the compute instance (e.g., in the case where the network virtualization device hosts a VNIC for the compute instance) or indirectly therefrom (e.g., in the case where the network virtualization device hosts a VNIC as a service for one or more compute instances, a router, a switch, a gateway, a load balancer, or the like). The packet's header can include scoping data by, for instance, having the data structure 800 of FIG. 8. At operation 1604, the network virtualization device determines the scoping data from the header of the packet. For instance, the scoping data is extracted from a scoping field of the header and indicates a network boundary(ies) within which the packet is permitted and/or prohibited to flow. At operation 1606, the network virtualization device determines a flow of the packet. For instance, this is a forward looking determination. In particular, the network virtualization device determines where the packet would be sent (e.g., a final destination or a next network hop) based on header information of the packet, mapping tables, routing tables, and/or network configuration information. At operation 1608, the network virtualization device determines whether the packet flow is permitted or not. For instance, if the destination (final destination or next hop destination) is within a permitted network boundary, the flow is determined to be permitted and operation 1610 follows operation 1608. Otherwise, the flow is not permitted and operation 1620 follows operation 1608. At operation 1610, the flow is permitted and, accordingly, the network virtualization device sends the packet forward. For instance, the network virtualization device updates the header information (e.g., by revising the encapsulation data as needed) and sends the packet to the destination. At operation 1620, the flow is prohibited and, accordingly, the network virtualization device drops the packet.

Example Infrastructure as a Service Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 17:
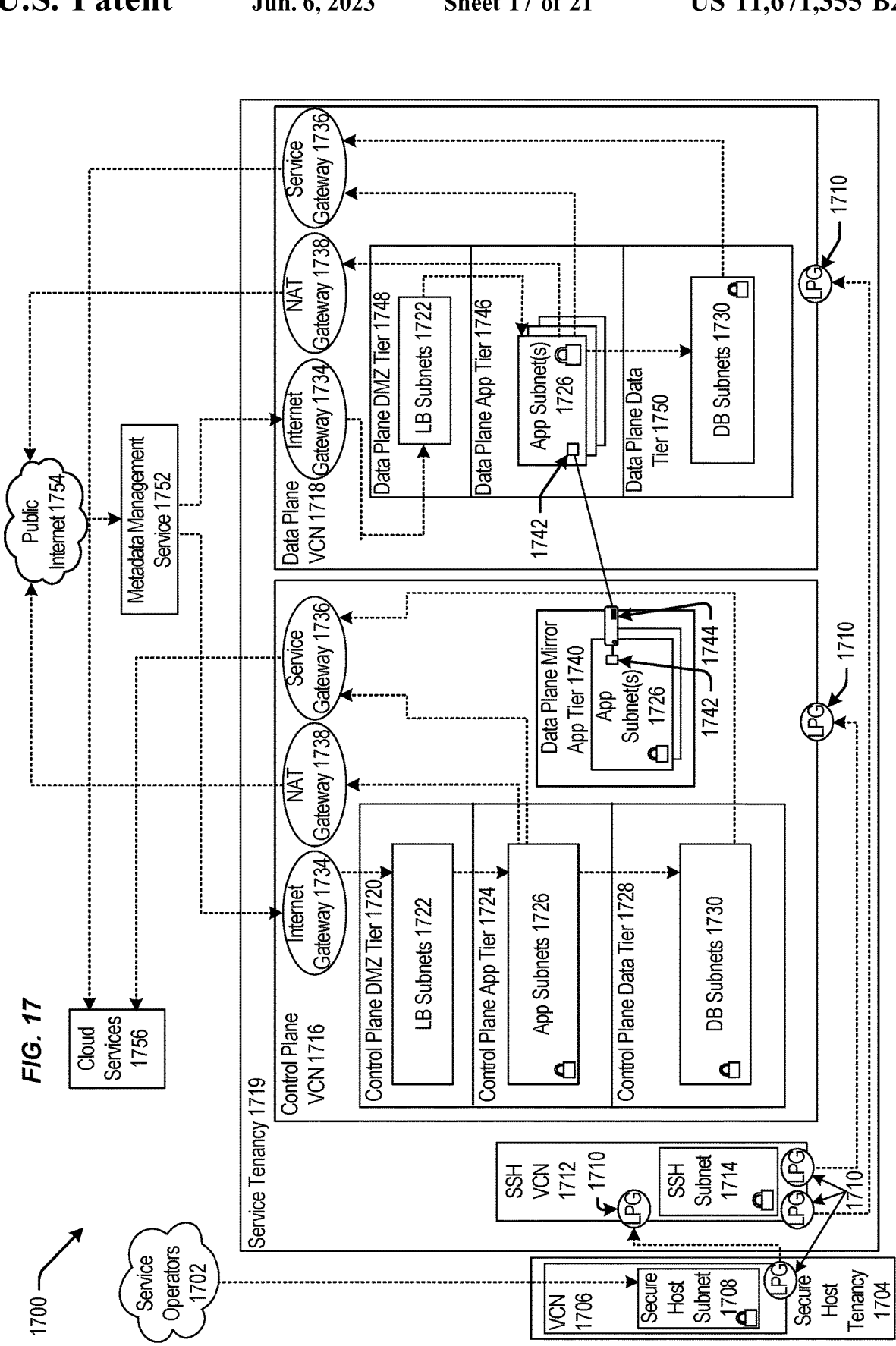
FIG. 17 is a block diagram illustrating one pattern for implementing a cloud infrastructure as a service system, according to at least one embodiment.

FIG. 17 is a block diagram 1700 illustrating an example pattern of an IaaS architecture, according to at least one embodiment. Service operators 1702 can be communicatively coupled to a secure host tenancy 1704 that can include a virtual cloud network (VCN) 1706 and a secure host subnet 1708. In some examples, the service operators 1702 may be using one or more client computing devices, which may be portable handheld devices (e.g., an iPhone®, cellular telephone, an iPad®, computing tablet, a personal digital assistant (PDA)) or wearable devices (e.g., a Google Glass® head-mounted display), running software such as Microsoft Windows Mobile®, and/or a variety of mobile operating systems such as iOS, Windows Phone, Android, BlackBerry 8, Palm OS, and the like, and be Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including without limitation the variety of GNU/Linux operating systems, such as, for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1706 and/or the Internet.

The VCN 1706 can include a local peering gateway (LPG) 1710 that can be communicatively coupled to a secure shell (SSH) VCN 1712 via an LPG 1710 contained in the SSH VCN 1712. The SSH VCN 1712 can include an SSH subnet 1714, and the SSH VCN 1712 can be communicatively coupled to a control plane VCN 1716 via the LPG 1710 contained in the control plane VCN 1716. Also, the SSH VCN 1712 can be communicatively coupled to a data plane VCN 1718 via an LPG 1710. The control plane VCN 1716 and the data plane VCN 1718 can be contained in a service tenancy 1719 that can be owned and/or operated by the IaaS provider.

The control plane VCN 1716 can include a control plane demilitarized zone (DMZ) tier 1720 that acts as a perimeter network (e.g., portions of a corporate network between the corporate intranet and external networks). The DMZ-based servers may have restricted responsibilities and help keep security breaches contained. Additionally, the DMZ tier 1720 can include one or more load balancer (LB) subnet(s) 1722, a control plane app tier 1724 that can include app subnet(s) 1726, a control plane data tier 1728 that can include database (DB) subnet(s) 1730 (e.g., frontend DB subnet(s) and/or backend DB subnet(s)). The LB subnet(s) 1722 contained in the control plane DMZ tier 1720 can be communicatively coupled to the app subnet(s) 1726 contained in the control plane app tier 1724 and an Internet gateway 1734 that can be contained in the control plane VCN 1716, and the app subnet(s) 1726 can be communicatively coupled to the DB subnet(s) 1730 contained in the control plane data tier 1728 and a service gateway 1736 and a network address translation (NAT) gateway 1738. The control plane VCN 1716 can include the service gateway 1736 and the NAT gateway 1738.

The control plane VCN 1716 can include a data plane mirror app tier 1740 that can include app subnet(s) 1726. The app subnet(s) 1726 contained in the data plane mirror app tier 1740 can include a virtual network interface controller (VNIC) 1742 that can execute a compute instance 1744. The compute instance 1744 can communicatively couple the app subnet(s) 1726 of the data plane mirror app tier 1740 to app subnet(s) 1726 that can be contained in a data plane app tier 1746.

The data plane VCN 1718 can include the data plane app tier 1746, a data plane DMZ tier 1748, and a data plane data tier 1750. The data plane DMZ tier 1748 can include LB subnet(s) 1722 that can be communicatively coupled to the app subnet(s) 1726 of the data plane app tier 1746 and the Internet gateway 1734 of the data plane VCN 1718. The app subnet(s) 1726 can be communicatively coupled to the service gateway 1736 of the data plane VCN 1718 and the NAT gateway 1738 of the data plane VCN 1718. The data plane data tier 1750 can also include the DB subnet(s) 1730 that can be communicatively coupled to the app subnet(s) 1726 of the data plane app tier 1746.

The Internet gateway 1734 of the control plane VCN 1716 and of the data plane VCN 1718 can be communicatively coupled to a metadata management service 1752 that can be communicatively coupled to public Internet 1754. Public Internet 1754 can be communicatively coupled to the NAT gateway 1738 of the control plane VCN 1716 and of the data plane VCN 1718. The service gateway 1736 of the control plane VCN 1716 and of the data plane VCN 1718 can be communicatively coupled to cloud services 1756.

In some examples, the service gateway 1736 of the control plane VCN 1716 or of the data plane VCN 1718 can make application programming interface (API) calls to cloud services 1756 without going through public Internet 1754. The API calls to cloud services 1756 from the service gateway 1736 can be one-way: the service gateway 1736 can make API calls to cloud services 1756, and cloud services 1756 can send requested data to the service gateway 1736. However, cloud services 1756 may not initiate API calls to the service gateway 1736.

In some examples, the secure host tenancy 1704 can be directly connected to the service tenancy 1719, which may be otherwise isolated. The secure host subnet 1708 can communicate with the SSH subnet 1714 through an LPG 1710 that may enable two-way communication over an otherwise isolated system. Connecting the secure host subnet 1708 to the SSH subnet 1714 may give the secure host subnet 1708 access to other entities within the service tenancy 1719.

The control plane VCN 1716 may allow users of the service tenancy 1719 to set up or otherwise provision desired resources. Desired resources provisioned in the control plane VCN 1716 may be deployed or otherwise used in the data plane VCN 1718. In some examples, the control plane VCN 1716 can be isolated from the data plane VCN 1718, and the data plane mirror app tier 1740 of the control plane VCN 1716 can communicate with the data plane app tier 1746 of the data plane VCN 1718 via VNICs 1742 that can be contained in the data plane mirror app tier 1740 and the data plane app tier 1746.

In some examples, users of the system, or customers, can make requests, for example create, read, update, or delete (CRUD) operations, through public Internet 1754 that can communicate the requests to the metadata management service 1752. The metadata management service 1752 can communicate the request to the control plane VCN 1716 through the Internet gateway 1734. The request can be received by the LB subnet(s) 1722 contained in the control plane DMZ tier 1720. The LB subnet(s) 1722 may determine that the request is valid, and in response to this determination, the LB subnet(s) 1722 can transmit the request to app subnet(s) 1726 contained in the control plane app tier 1724. If the request is validated and requires a call to public Internet 1754, the call to public Internet 1754 may be transmitted to the NAT gateway 1738 that can make the call to public Internet 1754. Memory that may be desired to be stored by the request can be stored in the DB subnet(s) 1730.

In some examples, the data plane mirror app tier 1740 can facilitate direct communication between the control plane VCN 1716 and the data plane VCN 1718. For example, changes, updates, or other suitable modifications to configuration may be desired to be applied to the resources contained in the data plane VCN 1718. Via a VNIC 1742, the control plane VCN 1716 can directly communicate with, and can thereby execute the changes, updates, or other suitable modifications to configuration to, resources contained in the data plane VCN 1718.

In some embodiments, the control plane VCN 1716 and the data plane VCN 1718 can be contained in the service tenancy 1719. In this case, the user, or the customer, of the system may not own or operate either the control plane VCN 1716 or the data plane VCN 1718. Instead, the IaaS provider may own or operate the control plane VCN 1716 and the data plane VCN 1718, both of which may be contained in the service tenancy 1719. This embodiment can enable isolation of networks that may prevent users or customers from interacting with other users', or other customers', resources. Also, this embodiment may allow users or customers of the system to store databases privately without needing to rely on public Internet 1754, which may not have a desired level of security, for storage.

In other embodiments, the LB subnet(s) 1722 contained in the control plane VCN 1716 can be configured to receive a signal from the service gateway 1736. In this embodiment, the control plane VCN 1716 and the data plane VCN 1718 may be configured to be called by a customer of the IaaS provider without calling public Internet 1754. Customers of the IaaS provider may desire this embodiment since database(s) that the customers use may be controlled by the IaaS provider and may be stored on the service tenancy 1719, which may be isolated from public Internet 1754.

Figure 18:
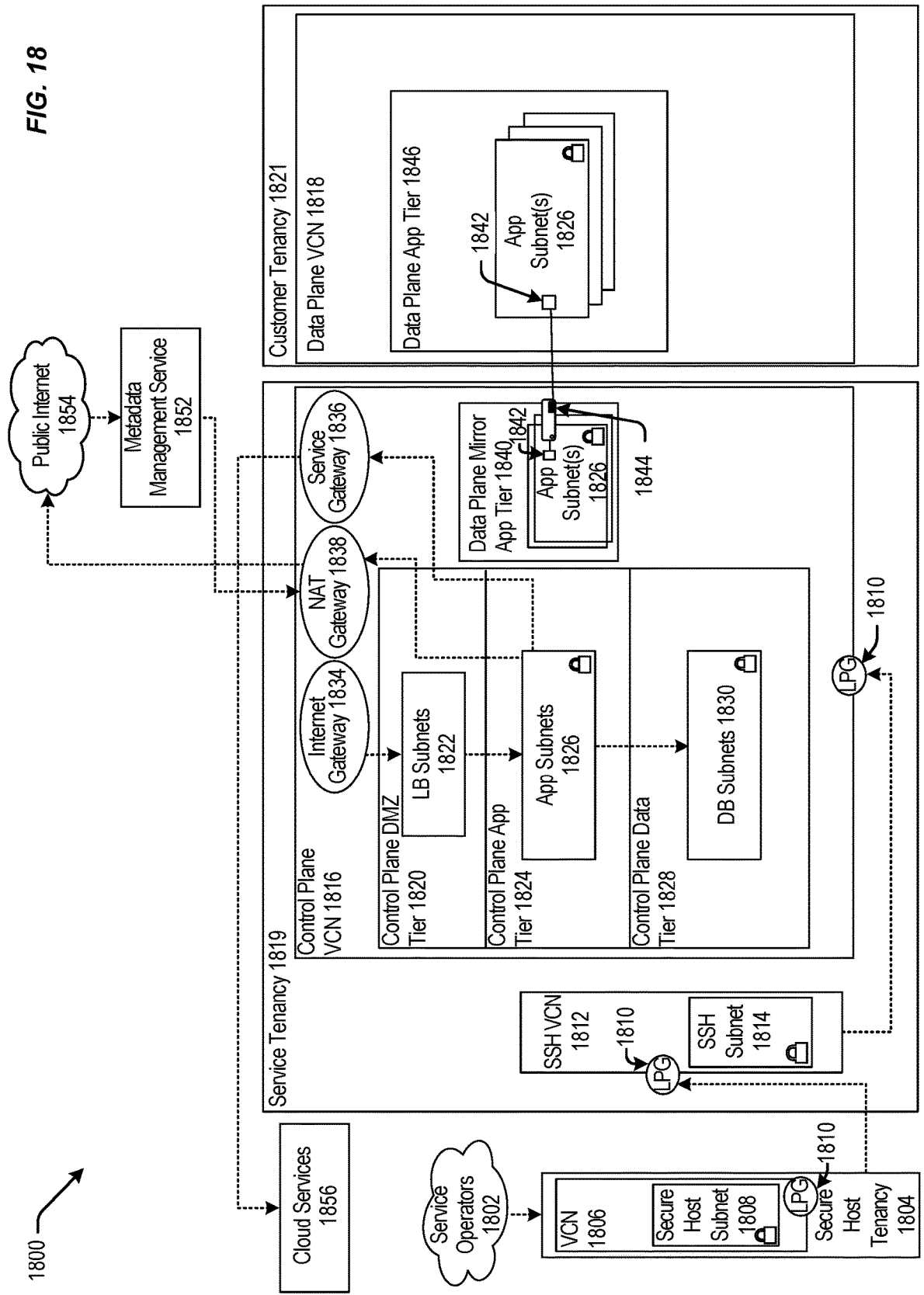
FIG. 18 is a block diagram illustrating another pattern for implementing a cloud infrastructure as a service system, according to at least one embodiment.

FIG. 18 is a block diagram 1800 illustrating another example pattern of an IaaS architecture, according to at least one embodiment. Service operators 1802 (e.g., service operators 1702 of FIG. 17) can be communicatively coupled to a secure host tenancy 1804 (e.g., the secure host tenancy 1704 of FIG. 17) that can include a virtual cloud network (VCN) 1806 (e.g., the VCN 1706 of FIG. 17) and a secure host subnet 1808 (e.g., the secure host subnet 1708 of FIG. 17). The VCN 1806 can include a local peering gateway (LPG) 1810 (e.g., the LPG 1710 of FIG. 17) that can be communicatively coupled to a secure shell (SSH) VCN 1812 (e.g., the SSH VCN 1712 of FIG. 17) via an LPG 1710 contained in the SSH VCN 1812. The SSH VCN 1812 can include an SSH subnet 1814 (e.g., the SSH subnet 1714 of FIG. 17), and the SSH VCN 1812 can be communicatively coupled to a control plane VCN 1816 (e.g., the control plane VCN 1716 of FIG. 17) via an LPG 1810 contained in the control plane VCN 1816. The control plane VCN 1816 can be contained in a service tenancy 1819 (e.g., the service tenancy 1719 of FIG. 17), and the data plane VCN 1818 (e.g., the data plane VCN 1718 of FIG. 17) can be contained in a customer tenancy 1821 that may be owned or operated by users, or customers, of the system.

The control plane VCN 1816 can include a control plane DMZ tier 1820 (e.g., the control plane DMZ tier 1720 of FIG. 17) that can include LB subnet(s) 1822 (e.g., LB subnet(s) 1722 of FIG. 17), a control plane app tier 1824 (e.g., the control plane app tier 1724 of FIG. 17) that can include app subnet(s) 1826 (e.g., app subnet(s) 1726 of FIG. 17), a control plane data tier 1828 (e.g., the control plane data tier 1728 of FIG. 17) that can include database (DB) subnet(s) 1830 (e.g., similar to DB subnet(s) 1730 of FIG. 17). The LB subnet(s) 1822 contained in the control plane DMZ tier 1820 can be communicatively coupled to the app subnet(s) 1826 contained in the control plane app tier 1824 and an Internet gateway 1834 (e.g., the Internet gateway 1734 of FIG. 17) that can be contained in the control plane VCN 1816, and the app subnet(s) 1826 can be communicatively coupled to the DB subnet(s) 1830 contained in the control plane data tier 1828 and a service gateway 1836 (e.g., the service gateway of FIG. 17) and a network address translation (NAT) gateway 1838 (e.g., the NAT gateway 1738 of FIG. 17). The control plane VCN 1816 can include the service gateway 1836 and the NAT gateway 1838.

The control plane VCN 1816 can include a data plane mirror app tier 1840 (e.g., the data plane mirror app tier 1740 of FIG. 17) that can include app subnet(s) 1826. The app subnet(s) 1826 contained in the data plane mirror app tier 1840 can include a virtual network interface controller (VNIC) 1842 (e.g., the VNIC of 1742) that can execute a compute instance 1844 (e.g., similar to the compute instance 1744 of FIG. 17). The compute instance 1844 can facilitate communication between the app subnet(s) 1826 of the data plane mirror app tier 1840 and the app subnet(s) 1826 that can be contained in a data plane app tier 1846 (e.g., the data plane app tier 1746 of FIG. 17) via the VNIC 1842 contained in the data plane mirror app tier 1840 and the VNIC 1842 contained in the data plane app tier 1846.

The Internet gateway 1834 contained in the control plane VCN 1816 can be communicatively coupled to a metadata management service 1852 (e.g., the metadata management service 1752 of FIG. 17) that can be communicatively coupled to public Internet 1854 (e.g., public Internet 1754 of FIG. 17). Public Internet 1854 can be communicatively coupled to the NAT gateway 1838 contained in the control plane VCN 1816. The service gateway 1836 contained in the control plane VCN 1816 can be communicatively coupled to cloud services 1856 (e.g., cloud services 1756 of FIG. 17).

In some examples, the data plane VCN 1818 can be contained in the customer tenancy 1821. In this case, the IaaS provider may provide the control plane VCN 1816 for each customer, and the IaaS provider may, for each customer, set up a unique compute instance 1844 that is contained in the service tenancy 1819. Each compute instance 1844 may allow communication between the control plane VCN 1816, contained in the service tenancy 1819, and the data plane VCN 1818 that is contained in the customer tenancy 1821. The compute instance 1844 may allow resources that are provisioned in the control plane VCN 1816 that is contained in the service tenancy 1819, to be deployed or otherwise used in the data plane VCN 1818 that is contained in the customer tenancy 1821.

In other examples, the customer of the IaaS provider may have databases that live in the customer tenancy 1821. In this example, the control plane VCN 1816 can include the data plane mirror app tier 1840 that can include app subnet(s) 1826. The data plane mirror app tier 1840 can reside in the data plane VCN 1818, but the data plane mirror app tier 1840 may not live in the data plane VCN 1818. That is, the data plane mirror app tier 1840 may have access to the customer tenancy 1821, but the data plane mirror app tier 1840 may not exist in the data plane VCN 1818 or be owned or operated by the customer of the IaaS provider. The data plane mirror app tier 1840 may be configured to make calls to the data plane VCN 1818 but may not be configured to make calls to any entity contained in the control plane VCN 1816. The customer may desire to deploy or otherwise use resources in the data plane VCN 1818 that are provisioned in the control plane VCN 1816, and the data plane mirror app tier 1840 can facilitate the desired deployment, or other usage of resources, of the customer.

In some embodiments, the customer of the IaaS provider can apply filters to the data plane VCN 1818. In this embodiment, the customer can determine what the data plane VCN 1818 can access, and the customer may restrict access to public Internet 1854 from the data plane VCN 1818. The IaaS provider may not be able to apply filters or otherwise control access of the data plane VCN 1818 to any outside networks or databases. Applying filters and controls by the customer onto the data plane VCN 1818, contained in the customer tenancy 1821, can help isolate the data plane VCN 1818 from other customers and from public Internet 1854.

In some embodiments, cloud services 1856 can be called by the service gateway 1836 to access services that may not exist on public Internet 1854, on the control plane VCN 1816, or on the data plane VCN 1818. The connection between cloud services 1856 and the control plane VCN 1816 or the data plane VCN 1818 may not be live or continuous. Cloud services 1856 may exist on a different network owned or operated by the IaaS provider. Cloud services 1856 may be configured to receive calls from the service gateway 1836 and may be configured to not receive calls from public Internet 1854. Some cloud services 1856 may be isolated from other cloud services 1856, and the control plane VCN 1816 may be isolated from cloud services 1856 that may not be in the same region as the control plane VCN 1816. For example, the control plane VCN 1816 may be located in "Region 1," and cloud service "Deployment 17" may be located in Region 1 and in "Region 2." If a call to Deployment 17 is made by the service gateway 1836 contained in the control plane VCN 1816 located in Region 1, the call may be transmitted to Deployment 17 in Region 1. In this example, the control plane VCN 1816, or Deployment 17 in Region 1, may not be communicatively coupled to, or otherwise in communication with, Deployment 17 in Region 2.

Figure 19:
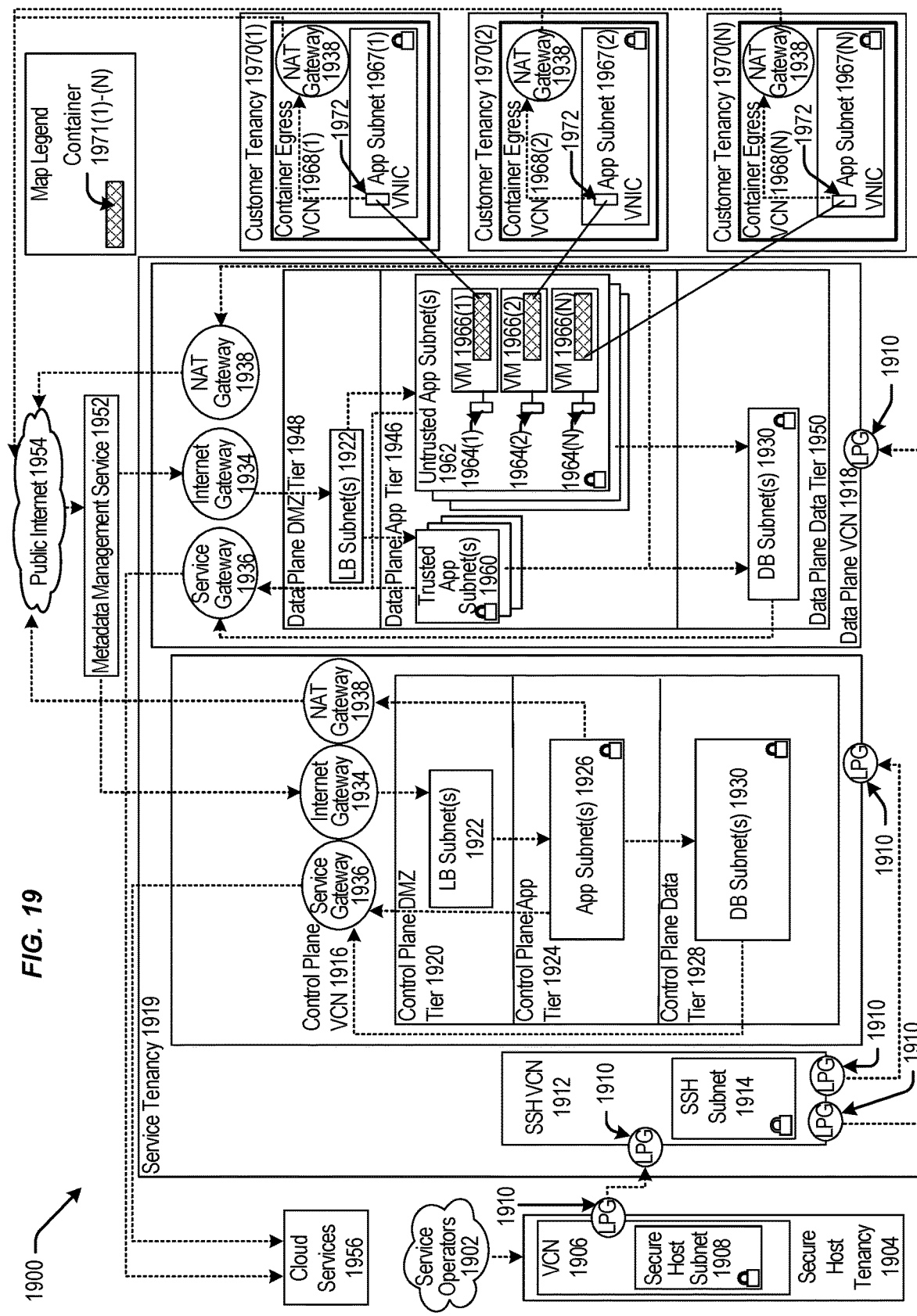
FIG. 19 is a block diagram illustrating another pattern for implementing a cloud infrastructure as a service system, according to at least one embodiment.

FIG. 19 is a block diagram 1900 illustrating another example pattern of an IaaS architecture, according to at least one embodiment. Service operators 1902 (e.g., service operators 1702 of FIG. 17) can be communicatively coupled to a secure host tenancy 1904 (e.g., the secure host tenancy 1704 of FIG. 17) that can include a virtual cloud network (VCN) 1906 (e.g., the VCN 1706 of FIG. 17) and a secure host subnet 1908 (e.g., the secure host subnet 1708 of FIG. 17). The VCN 1906 can include an LPG 1910 (e.g., the LPG 1710 of FIG. 17) that can be communicatively coupled to an SSH VCN 1912 (e.g., the SSH VCN 1712 of FIG. 17) via an LPG 1910 contained in the SSH VCN 1912. The SSH VCN 1912 can include an SSH subnet 1914 (e.g., the SSH subnet 1714 of FIG. 17), and the SSH VCN 1912 can be communicatively coupled to a control plane VCN 1916 (e.g., the control plane VCN 1716 of FIG. 17) via an LPG 1910 contained in the control plane VCN 1916 and to a data plane VCN 1918 (e.g., the data plane 1718 of FIG. 17) via an LPG 1910 contained in the data plane VCN 1918. The control plane VCN 1916 and the data plane VCN 1918 can be contained in a service tenancy 1919 (e.g., the service tenancy 1719 of FIG. 17).

The control plane VCN 1916 can include a control plane DMZ tier 1920 (e.g., the control plane DMZ tier 1720 of FIG. 17) that can include load balancer (LB) subnet(s) 1922 (e.g., LB subnet(s) 1722 of FIG. 17), a control plane app tier 1924 (e.g., the control plane app tier 1724 of FIG. 17) that can include app subnet(s) 1926 (e.g., similar to app subnet(s) 1726 of FIG. 17), and a control plane data tier 1928 (e.g., the control plane data tier 1728 of FIG. 17) that can include DB subnet(s) 1930. The LB subnet(s) 1922 contained in the control plane DMZ tier 1920 can be communicatively coupled to the app subnet(s) 1926 contained in the control plane app tier 1924 and to an Internet gateway 1934 (e.g., the Internet gateway 1734 of FIG. 17) that can be contained in the control plane VCN 1916, and the app subnet(s) 1926 can be communicatively coupled to the DB subnet(s) 1930 contained in the control plane data tier 1928 and to a service gateway 1936 (e.g., the service gateway of FIG. 17) and a network address translation (NAT) gateway 1938 (e.g., the NAT gateway 1738 of FIG. 17). The control plane VCN 1916 can include the service gateway 1936 and the NAT gateway 1938.

The data plane VCN 1918 can include a data plane app tier 1946 (e.g., the data plane app tier 1746 of FIG. 17), a data plane DMZ tier 1948 (e.g., the data plane DMZ tier 1748 of FIG. 17), and a data plane data tier 1950 (e.g., the data plane data tier 1750 of FIG. 17). The data plane DMZ tier 1948 can include LB subnet(s) 1922 that can be communicatively coupled to trusted app subnet(s) 1960 and untrusted app subnet(s) 1962 of the data plane app tier 1946 and the Internet gateway 1934 contained in the data plane VCN 1918. The trusted app subnet(s) 1960 can be communicatively coupled to the service gateway 1936 contained in the data plane VCN 1918, the NAT gateway 1938 contained in the data plane VCN 1918, and DB subnet(s) 1930 contained in the data plane data tier 1950. The untrusted app subnet(s) 1962 can be communicatively coupled to the service gateway 1936 contained in the data plane VCN 1918 and DB subnet(s) 1930 contained in the data plane data tier 1950. The data plane data tier 1950 can include DB subnet(s) 1930 that can be communicatively coupled to the service gateway 1936 contained in the data plane VCN 1918.

The untrusted app subnet(s) 1962 can include one or more primary VNICs 1964(1)-(N) that can be communicatively coupled to tenant virtual machines (VMs) 1966(1)-(N). Each tenant VM 1966(1)-(N) can be communicatively coupled to a respective app subnet 1967(1)-(N) that can be contained in respective container egress VCNs 1968(1)-(N) that can be contained in respective customer tenancies 1970(1)-(N). Respective secondary VNICs 1972(1)-(N) can facilitate communication between the untrusted app subnet(s) 1962 contained in the data plane VCN 1918 and the app subnet contained in the container egress VCNs 1968(1)-(N). Each container egress VCNs 1968(1)-(N) can include a NAT gateway 1938 that can be communicatively coupled to public Internet 1954 (e.g., public Internet 1754 of FIG. 17).

The Internet gateway 1934 contained in the control plane VCN 1916 and contained in the data plane VCN 1918 can be communicatively coupled to a metadata management service 1952 (e.g., the metadata management system 1752 of FIG. 17) that can be communicatively coupled to public Internet 1954. Public Internet 1954 can be communicatively coupled to the NAT gateway 1938 contained in the control plane VCN 1916 and contained in the data plane VCN 1918. The service gateway 1936 contained in the control plane VCN 1916 and contained in the data plane VCN 1918 can be communicatively coupled to cloud services 1956.

In some embodiments, the data plane VCN 1918 can be integrated with customer tenancies 1970. This integration can be useful or desirable for customers of the IaaS provider in some cases such as a case in which support may be desired when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1946. Code to run the function may be executed in the VMs 1966(1)-(N), and the code may not be configured to run anywhere else on the data plane VCN 1918. Each VM 1966(1)-(N) may be connected to one customer tenancy 1970. Respective containers 1971(1)-(N) contained in the VMs 1966(1)-(N) may be configured to run the code. In this case, there can be a dual isolation (e.g., the containers 1971(1)-(N) running code, where the containers 1971(1)-(N) may be contained in at least the VMs 1966(1)-(N) that are contained in the untrusted app subnet(s) 1962), which may help prevent incorrect or otherwise undesirable code from damaging the network of the IaaS provider or from damaging a network of a different customer. The containers 1971(1)-(N) may be communicatively coupled to the customer tenancy 1970 and may be configured to transmit or receive data from the customer tenancy 1970. The containers 1971(1)-(N) may not be configured to transmit or receive data from any other entity in the data plane VCN 1918. Upon completion of running the code, the IaaS provider may kill or otherwise dispose of the containers 1971(1)-(N).

In some embodiments, the trusted app subnet(s) 1960 may run code that may be owned or operated by the IaaS provider. In this embodiment, the trusted app subnet(s) 1960 may be communicatively coupled to the DB subnet(s) 1930 and be configured to execute CRUD operations in the DB subnet(s) 1930. The untrusted app subnet(s) 1962 may be communicatively coupled to the DB subnet(s) 1930, but in this embodiment, the untrusted app subnet(s) may be configured to execute read operations in the DB subnet(s) 1930. The containers 1971(1)-(N) that can be contained in the VM 1966(1)-(N) of each customer and that may run code from the customer may not be communicatively coupled with the DB subnet(s) 1930.

In other embodiments, the control plane VCN 1916 and the data plane VCN 1918 may not be directly communicatively coupled. In this embodiment, there may be no direct communication between the control plane VCN 1916 and the data plane VCN 1918. However, communication can occur indirectly through at least one method. An LPG 1910 may be established by the IaaS provider that can facilitate communication between the control plane VCN 1916 and the data plane VCN 1918. In another example, the control plane VCN 1916 or the data plane VCN 1918 can make a call to cloud services 1956 via the service gateway 1936. For example, a call to cloud services 1956 from the control plane VCN 1916 can include a request for a service that can communicate with the data plane VCN 1918.

Figure 20:
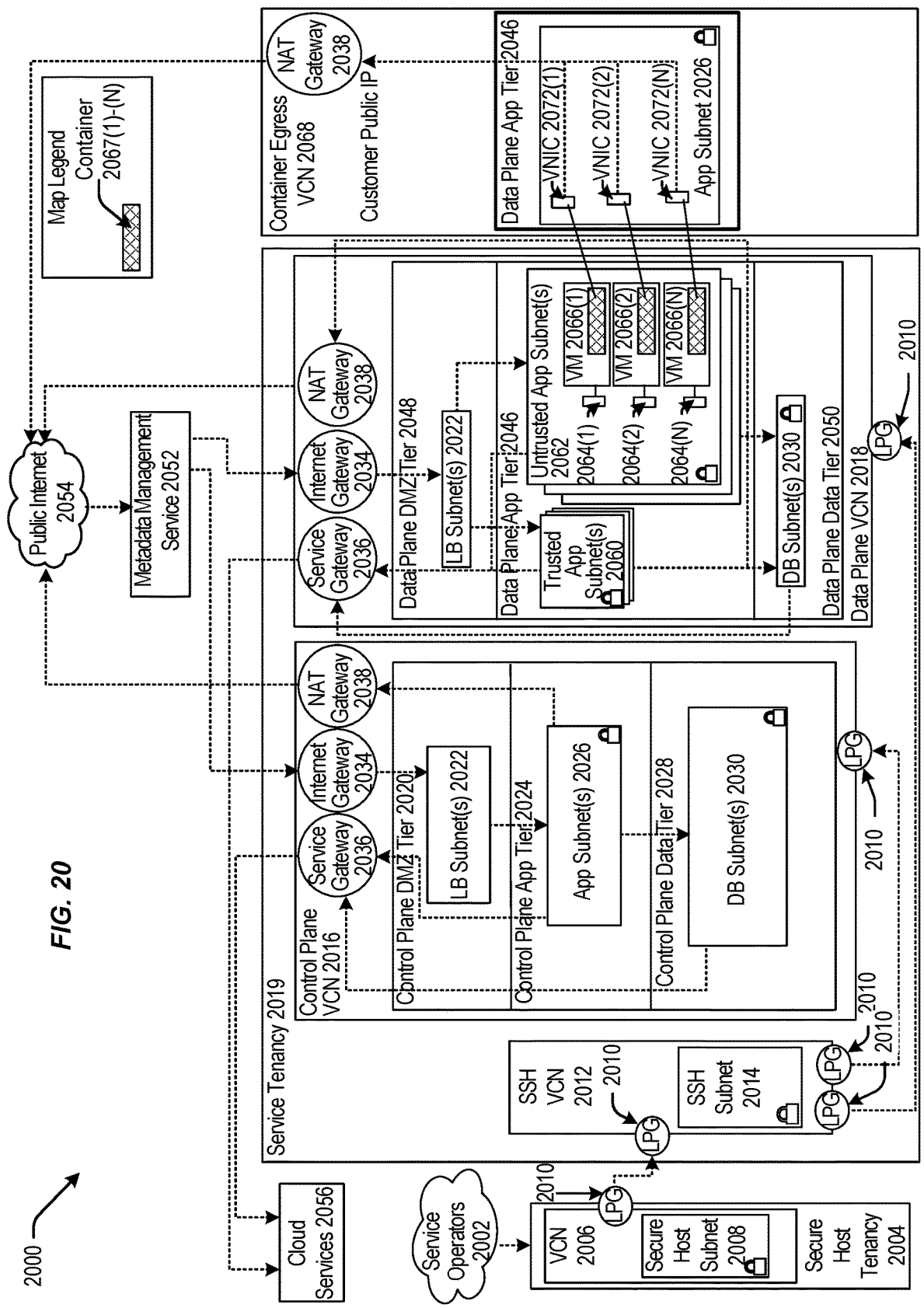
FIG. 20 is a block diagram illustrating another pattern for implementing a cloud infrastructure as a service system, according to at least one embodiment.

FIG. 20 is a block diagram 2000 illustrating another example pattern of an IaaS architecture, according to at least one embodiment. Service operators 2002 (e.g., service operators 1702 of FIG. 17) can be communicatively coupled to a secure host tenancy 2004 (e.g., the secure host tenancy 1704 of FIG. 17) that can include a virtual cloud network (VCN) 2006 (e.g., the VCN 1706 of FIG. 17) and a secure host subnet 2008 (e.g., the secure host subnet 1708 of FIG. 17). The VCN 2006 can include an LPG 2010 (e.g., the LPG 1710 of FIG. 17) that can be communicatively coupled to an SSH VCN 2012 (e.g., the SSH VCN 1712 of FIG. 17) via an LPG 2010 contained in the SSH VCN 2012. The SSH VCN 2012 can include an SSH subnet 2014 (e.g., the SSH subnet 1714 of FIG. 17), and the SSH VCN 2012 can be communicatively coupled to a control plane VCN 2016 (e.g., the control plane VCN 1716 of FIG. 17) via an LPG 2010 contained in the control plane VCN 2016 and to a data plane VCN 2018 (e.g., the data plane 1718 of FIG. 17) via an LPG 2010 contained in the data plane VCN 2018. The control plane VCN 2016 and the data plane VCN 2018 can be contained in a service tenancy 2019 (e.g., the service tenancy 1719 of FIG. 17).

The control plane VCN 2016 can include a control plane DMZ tier 2020 (e.g., the control plane DMZ tier 1720 of FIG. 17) that can include LB subnet(s) 2022 (e.g., LB subnet(s) 1722 of FIG. 17), a control plane app tier 2024 (e.g., the control plane app tier 1724 of FIG. 17) that can include app subnet(s) 2026 (e.g., app subnet(s) 1726 of FIG. 17), a control plane data tier 2028 (e.g., the control plane data tier 1728 of FIG. 17) that can include DB subnet(s) 2030 (e.g., DB subnet(s) 1930 of FIG. 19). The LB subnet(s) 2022 contained in the control plane DMZ tier 2020 can be communicatively coupled to the app subnet(s) 2026 contained in the control plane app tier 2024 and to an Internet gateway 2034 (e.g., the Internet gateway 1734 of FIG. 17) that can be contained in the control plane VCN 2016, and the app subnet(s) 2026 can be communicatively coupled to the DB subnet(s) 2030 contained in the control plane data tier 2028 and to a service gateway 2036 (e.g., the service gateway of FIG. 17) and a network address translation (NAT) gateway 2038 (e.g., the NAT gateway 1738 of FIG. 17). The control plane VCN 2016 can include the service gateway 2036 and the NAT gateway 2038.

The data plane VCN 2018 can include a data plane app tier 2046 (e.g., the data plane app tier 1746 of FIG. 17), a data plane DMZ tier 2048 (e.g., the data plane DMZ tier 1748 of FIG. 17), and a data plane data tier 2050 (e.g., the data plane data tier 1750 of FIG. 17). The data plane DMZ tier 2048 can include LB subnet(s) 2022 that can be communicatively coupled to trusted app subnet(s) 2060 (e.g., trusted app subnet(s) 1960 of FIG. 19) and untrusted app subnet(s) 2062 (e.g., untrusted app subnet(s) 1962 of FIG. 19) of the data plane app tier 2046 and the Internet gateway 2034 contained in the data plane VCN 2018. The trusted app subnet(s) 2060 can be communicatively coupled to the service gateway 2036 contained in the data plane VCN 2018, the NAT gateway 2038 contained in the data plane VCN 2018, and DB subnet(s) 2030 contained in the data plane data tier 2050. The untrusted app subnet(s) 2062 can be communicatively coupled to the service gateway 2036 contained in the data plane VCN 2018 and DB subnet(s) 2030 contained in the data plane data tier 2050. The data plane data tier 2050 can include DB subnet(s) 2030 that can be communicatively coupled to the service gateway 2036 contained in the data plane VCN 2018.

The untrusted app subnet(s) 2062 can include primary VNICs 2064(1)-(N) that can be communicatively coupled to tenant virtual machines (VMs) 2066(1)-(N) residing within the untrusted app subnet(s) 2062. Each tenant VM 2066(1)-(N) can run code in a respective container 2067(1)-(N), and be communicatively coupled to an app subnet 2026 that can be contained in a data plane app tier 2046 that can be contained in a container egress VCN 2068. Respective secondary VNICs 2072(1)-(N) can facilitate communication between the untrusted app subnet(s) 2062 contained in the data plane VCN 2018 and the app subnet contained in the container egress VCN 2068. The container egress VCN can include a NAT gateway 2038 that can be communicatively coupled to public Internet 2054 (e.g., public Internet 1754 of FIG. 17).

The Internet gateway 2034 contained in the control plane VCN 2016 and contained in the data plane VCN 2018 can be communicatively coupled to a metadata management service 2052 (e.g., the metadata management system 1752 of FIG. 17) that can be communicatively coupled to public Internet 2054. Public Internet 2054 can be communicatively coupled to the NAT gateway 2038 contained in the control plane VCN 2016 and contained in the data plane VCN 2018. The service gateway 2036 contained in the control plane VCN 2016 and contained in the data plane VCN 2018 can be communicatively coupled to cloud services 2056.

In some examples, the pattern illustrated by the architecture of block diagram 2000 of FIG. 20 may be considered an exception to the pattern illustrated by the architecture of block diagram 1900 of FIG. 19 and may be desirable for a customer of the IaaS provider if the IaaS provider cannot directly communicate with the customer (e.g., a disconnected region). The respective containers 2067(1)-(N) that are contained in the VMs 2066(1)-(N) for each customer can be accessed in real-time by the customer. The containers 2067(1)-(N) may be configured to make calls to respective secondary VNICs 2072(1)-(N) contained in app subnet(s) 2026 of the data plane app tier 2046 that can be contained in the container egress VCN 2068. The secondary VNICs 2072(1)-(N) can transmit the calls to the NAT gateway 2038 that may transmit the calls to public Internet 2054. In this example, the containers 2067(1)-(N) that can be accessed in real-time by the customer can be isolated from the control plane VCN 2016 and can be isolated from other entities contained in the data plane VCN 2018. The containers 2067(1)-(N) may also be isolated from resources from other customers.

In other examples, the customer can use the containers 2067(1)-(N) to call cloud services 2056. In this example, the customer may run code in the containers 2067(1)-(N) that requests a service from cloud services 2056. The containers 2067(1)-(N) can transmit this request to the secondary VNICs 2072(1)-(N) that can transmit the request to the NAT gateway that can transmit the request to public Internet 2054. Public Internet 2054 can transmit the request to LB subnet(s) 2022 contained in the control plane VCN 2016 via the Internet gateway 2034. In response to determining the request is valid, the LB subnet(s) can transmit the request to app subnet(s) 2026 that can transmit the request to cloud services 2056 via the service gateway 2036.

It should be appreciated that IaaS architectures 1700, 1800, 1900, 2000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 21:
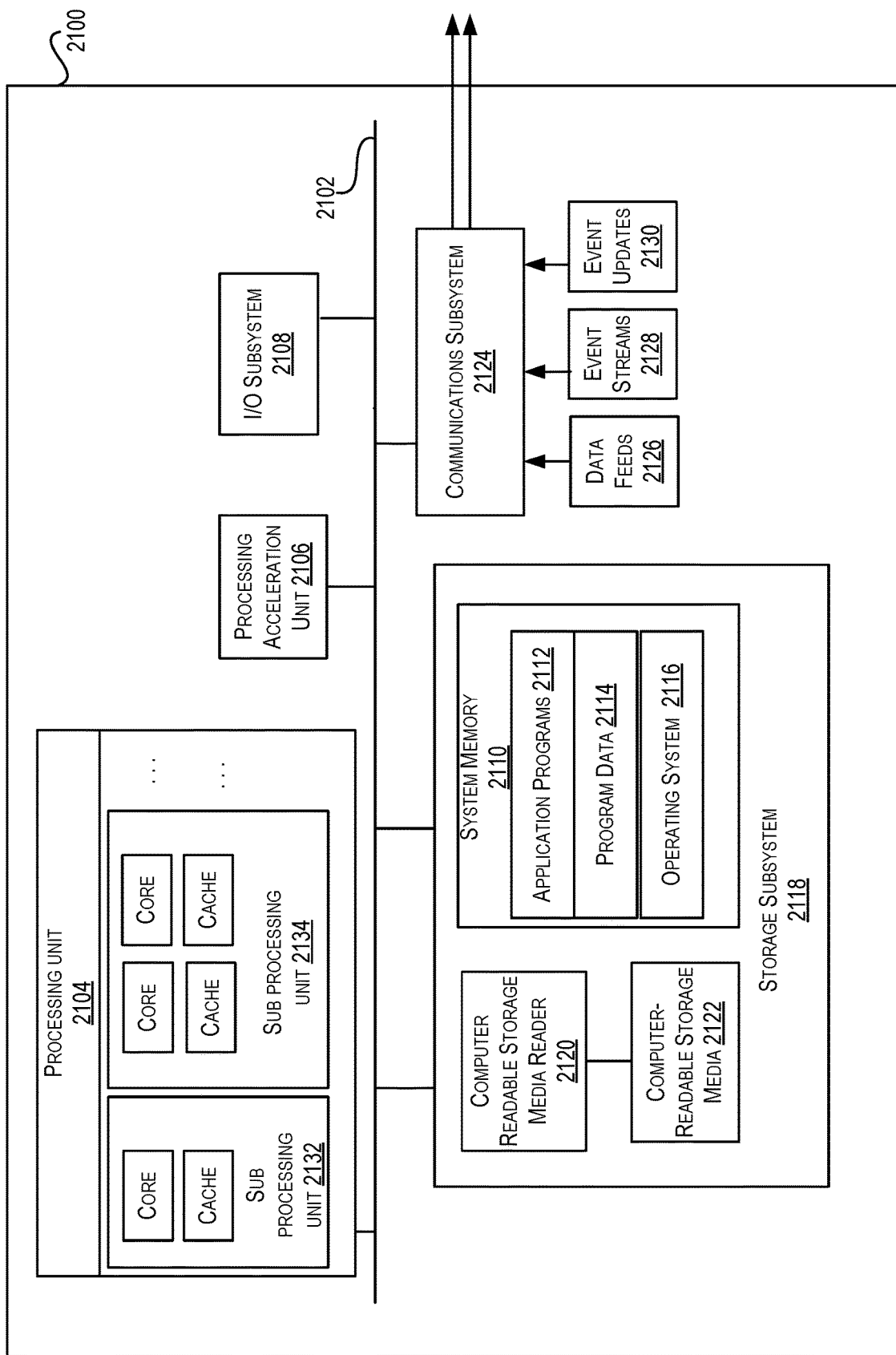
FIG. 21 is a block diagram illustrating an example computer system, according to at least one embodiment.

FIG. 21 illustrates an example computer system 2100, in which various embodiments may be implemented. The system 2100 may be used to implement any of the computer systems described above. As shown in the figure, computer system 2100 includes a processing unit 2104 that communicates with a number of peripheral subsystems via a bus subsystem 2102. These peripheral subsystems may include a processing acceleration unit 2106, an I/O subsystem 2108, a storage subsystem 2118 and a communications subsystem 2124. Storage subsystem 2118 includes tangible computer-readable storage media 2122 and a system memory 2110.

Bus subsystem 2102 provides a mechanism for letting the various components and subsystems of computer system 2100 communicate with each other as intended. Although bus subsystem 2102 is shown schematically as a single bus, alternative embodiments of the bus subsystem may utilize multiple buses. Bus subsystem 2102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2104, which can be implemented as one or more integrated circuits (e.g., a conventional microprocessor or microcontroller), controls the operation of computer system 2100. One or more processors may be included in processing unit 2104. These processors may include single core or multicore processors. In certain embodiments, processing unit 2104 may be implemented as one or more independent processing units 2132 and/or 2134 with single or multicore processors included in each processing unit. In other embodiments, processing unit 2104 may also be implemented as a quad-core processing unit formed by integrating two dual-core processors into a single chip.

In various embodiments, processing unit 2104 can execute a variety of programs in response to program code and can maintain multiple concurrently executing programs or processes. At any given time, some or all of the program code to be executed can be resident in processor(s) 2104 and/or in storage subsystem 2118. Through suitable programming, processor(s) 2104 can provide various functionalities described above. Computer system 2100 may additionally include a processing acceleration unit 2106, which can include a digital signal processor (DSP), a special-purpose processor, and/or the like.

I/O subsystem 2108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, or medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2100 may comprise a storage subsystem 2118 that comprises software elements, shown as being currently located within a system memory 2110. System memory 2110 may store program instructions that are loadable and executable on processing unit 2104, as well as data generated during the execution of these programs.

Depending on the configuration and type of computer system 2100, system memory 2110 may be volatile (such as random access memory (RAM)) and/or non-volatile (such as read-only memory (ROM), flash memory, etc.). The RAM typically contains data and/or program modules that are immediately accessible to and/or presently being operated and executed by processing unit 2104. In some implementations, system memory 2110 may include multiple different types of memory, such as static random access memory (SRAM) or dynamic random access memory (DRAM). In some implementations, a basic input/output system (BIOS), containing the basic routines that help to transfer information between elements within computer system 2100, such as during start-up, may typically be stored in the ROM. By way of example, and not limitation, system memory 2110 also illustrates application programs 2112, which may include client applications, Web browsers, mid-tier applications, relational database management systems (RDBMS), etc., program data 2114, and an operating system 2116. By way of example, operating system 2116 may include various versions of Microsoft Windows®, Apple Macintosh®, and/or Linux operating systems, a variety of commercially available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 21 OS, and Palm® OS operating systems.

Storage subsystem 2118 may also provide a tangible computer-readable storage medium for storing the basic programming and data constructs that provide the functionality of some embodiments. Software (programs, code modules, instructions) that, when executed by a processor, provides the functionality described above may be stored in storage subsystem 2118. These software modules or instructions may be executed by processing unit 2104. Storage subsystem 2118 may also provide a repository for storing data used in accordance with the present disclosure.

Storage subsystem 2100 may also include a computer-readable storage media reader 2120 that can further be connected to computer-readable storage media 2122. Together and, optionally, in combination with system memory 2110, computer-readable storage media 2122 may comprehensively represent remote, local, fixed, and/or removable storage devices plus storage media for temporarily and/or more permanently containing, storing, transmitting, and retrieving computer-readable information.

Computer-readable storage media 2122 containing code, or portions of code, can also include any appropriate media known or used in the art, including storage media and communication media, such as, but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2100.

By way of example, computer-readable storage media 2122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2122 may include, but is not limited to, Zip® drives, flash memory cards, universal serial bus (USB) flash drives, secure digital (SD) cards, DVD disks, digital video tape, and the like. Computer-readable storage media 2122 may also include solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2100.

Communications subsystem 2124 provides an interface to other computer systems and networks. Communications subsystem 2124 serves as an interface for receiving data from and transmitting data to other systems from computer system 2100. For example, communications subsystem 2124 may enable computer system 2100 to connect to one or more devices via the Internet. In some embodiments communications subsystem 2124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2124 can provide wired network connectivity (e.g., Ethernet) in addition to or instead of a wireless interface.

In some embodiments, communications subsystem 2124 may also receive input communication in the form of structured and/or unstructured data feeds 2126, event streams 2128, event updates 2130, and the like on behalf of one or more users who may use computer system 2100.

By way of example, communications subsystem 2124 may be configured to receive data feeds 2126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2124 may also be configured to receive data in the form of continuous data streams, which may include event streams 2128 of real-time events and/or event updates 2130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 2124 may also be configured to output the structured and/or unstructured data feeds 2126, event streams 2128, event updates 2130, and the like to one or more databases that may be in communication with one or more streaming data source computers coupled to computer system 2100.

Computer system 2100 can be one of various types, including a handheld portable device (e.g., an iPhone® cellular phone, an iPad® computing tablet, a PDA), a wearable device (e.g., a Google Glass® head-mounted display), a PC, a workstation, a mainframe, a kiosk, a server rack, or any other data processing system.

In the foregoing description, for the purposes of explanation, specific details are set forth to provide a thorough understanding of examples of the disclosure. However, it will be apparent that various examples may be practiced without these specific details. The ensuing description provides examples only and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims. The figures and description are not intended to be restrictive. Circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples. The teachings disclosed herein can also be applied to various types of applications such as mobile applications, non-mobile applications, desktop applications, web applications, enterprise applications, and the like. Further, the teachings of this disclosure are not restricted to a particular operating environment (e.g., operating systems, devices, platforms, and the like), but instead can be applied to multiple different operating environments.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be rearranged. A process is terminated when its operations are completed, but the process could have additional steps not included in a figure. A process may correspond to a method, a function, a procedure, a subroutine, a subprogram, and so on. When a process corresponds to a function, its termination may correspond to a return of the function to the calling function or the main function.

The words "example" and "exemplary" are used herein to mean "serving as an example, instance, or illustration." Any embodiment or design described herein as "exemplary" or "example" is not necessarily to be construed as preferred or advantageous over other embodiments or designs.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data may be stored and which does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, or memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, and so forth may be passed, forwarded, or transmitted via any suitable means including memory sharing, message passing, token passing, network transmission, and so forth.

Furthermore, examples may be implemented by hardware, software, firmware, middleware, microcode, hardware description languages, or any combination thereof. When implemented in software, firmware, middleware, or microcode, the program code or code segments to perform the necessary tasks (e.g., a computer-program product) may be stored in a machine-readable medium. A processor(s) may perform the necessary tasks. Systems depicted in some of the figures may be provided in various configurations. In some examples, the systems may be configured as a distributed system where one or more components of the system are distributed across one or more networks in a cloud computing system. Where components are described as being "configured to" perform certain operations, such configuration may be accomplished, for example, by designing electronic circuits or other hardware to perform the operation, by programming or controlling electronic circuits (e.g., microprocessors or other suitable electronic circuits) to perform the operation, or any combination thereof.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including, but not limited to, conventional techniques for inter-process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer system comprising:
   a virtual network of a customer, wherein the virtual network is hosted on a substrate network and comprises a compute instance;
   a first network virtualization device of the substrate network, wherein the first network virtualization device comprises one or more processors and one or more memories storing computer-readable instructions that, upon execution by the one or more processors, configure the first network virtualization device to:
      receive a packet generated by the compute instance;
      determine, based on a flow packet rule associated with the compute instance, a network boundary defining a set of one or more networks such that a first packet having a destination within the network boundary can flow and such that a second packet having a destination outside of the network boundary is to be dropped;
      determine that a flow of the packet is within the network boundary;
      generate data indicating that the flow of the packet is permitted within the network boundary;
      include the data in the packet; and
      send, to a second network virtualization device and based on the flow, the packet that includes the data.

2. The computer system of claim 1, wherein the network boundary is defined based on input of the customer and corresponds to at least one of: a layer 2 (L2) virtual local area network (VLAN) within the virtual network, a layer 3 (L3) subnet within the virtual network, the virtual network, a private network of the customer peered with the virtual network, another virtual network peered with the virtual network, or a public network.

3. The computer system of claim 1, wherein the compute instance executes on a host machine of the substrate network, wherein the first network virtualization device receives the packet from the host machine, executes a virtual network interface card that is associated with the compute instance and that is usable to send the packet on the virtual network, and stores the packet flow rule in association with the virtual network interface card.

4. The computer system of claim 1, wherein the execution of the computer-readable instructions further configures the first network virtualization device to:
   receive customer data indicating the packet flow rule, the customer data corresponding to a selection by the customer of the network boundary from a set of network boundaries; and
   generate the packet flow rule based on the customer data.

5. The computer system of claim 4, wherein the customer data further indicates that the network boundary is selected specifically for the compute instance, and wherein the packet flow rule is generated specifically for the compute instance.

6. The computer system of claim 4, wherein the customer data further indicates that the network boundary is selected for a plurality of compute instances that are hosted on the virtual network of the customer and that comprise a second compute instance, and wherein a second packet flow rule is associated with the second compute instance and indicates the network boundary.

7. The computer system of claim 1, wherein the data is included in a field of a header of the packet, wherein the field indicates the network boundary.

8. The computer system of claim 7, wherein the field further indicates that packets generated by the compute instance are prohibited from flowing within another customer-selectable network boundary.

9. The computer system of claim 1, wherein the second network virtualization device comprises one or more second processors and one or more second memories storing second computer-readable instructions that, upon execution by the one or more second processors, configure the second network virtualization device to:

receive the packet sent by the first network virtualization device; and enforce the network boundary by at least determining, based on the data included in the packet, that the packet is permitted to flow within the network boundary, and sending the packet to a third network virtualization device or a host machine within the network boundary, wherein the host machine executes a second compute instance that is a destination of the packet.

10. The computer system of claim 1, wherein the second network virtualization device comprises one or more second processors and one or more second memories storing second computer-readable instructions that, upon execution by the one or more second processors, configure the second network virtualization device to:

receive a third packet generated by a second compute instance; and enforce a second network boundary by at least determining, based on second data included in the third packet, that the third packet is permitted to flow within the second network boundary, wherein the second data is included in the third packet based on a third packet flow rule associated with the second compute instance, and wherein the second network boundary is the same as or different from the network boundary, determining that the first network virtualization device is within the second network boundary, and sending the third packet to the first network virtualization device.

11. The computer system of claim 1, wherein the second network virtualization device comprises one or more second processors and one or more second memories storing second computer-readable instructions that, upon execution by the one or more second processors, configure the second network virtualization device to:

receive a third packet generated by a second compute instance;

determine, based on a second packet flow rule associated with the second compute instance, a second network boundary within which packets of the second compute instance can flow;

determine that a flow of the third packet is within the second network boundary;

generate second data indicating that the flow of the third packet is permitted within the second network boundary;

include the second data in the third packet; and send, to the first network virtualization device and based on the first network virtualization device being within the second network boundary, the third packet that includes the second data.

12. The computer system of claim 1, wherein the execution of the computer-readable instructions further configures the first network virtualization device to:

receive, from the second network virtualization device, a third packet that includes second data indicating that the third packet is permitted to flow within a second network boundary, wherein the second data is included in the third packet based on a second packet flow rule, and wherein the second network boundary is the same as or different from the network boundary; and enforce the second network boundary by at least determining, based on the second network boundary, that the third packet is permitted to flow to the compute instance, and sending the third packet to a host machine of the compute instance.

13. A method implemented by a first network virtualization device, the method comprising:

receiving a packet generated by a compute instance of a virtual network associated with a customer;

determining, based on a flow packet rule associated with the compute instance, a network boundary defining a set of one or more networks such that a first packet having a destination within the network boundary can flow and such that a second packet having a destination outside of the network boundary is to be dropped;

determining that a flow of the packet is within the network boundary;

generating data indicating that the flow of the packet is permitted within the network boundary;

including the data in the packet; and sending, to a second network virtualization device and based on the flow, the packet that includes the data.

14. The method of claim 13, further comprising:

receiving, from the second network virtualization device, a third packet that includes second data indicating that the third packet is permitted to flow within a second network boundary, wherein the second data is included in the third packet based on a second packet flow rule, and wherein the second network boundary is the same as or different from the network boundary; and enforcing the second network boundary by at least determining that the third packet is permitted to flow to the compute instance, and sending the third packet to a host machine of the compute instance.

15. The method of claim 13, further comprising:

receiving, from the second network virtualization device, a third packet that includes second data, wherein the second data indicates that the third packet is prohibited from flowing within the network boundary; and enforcing a second network boundary by at least determining that a flow of the third packet includes a portion that is within the network boundary, and dropping, based on the second data, the third packet.

16. The method of claim 13, further comprising:

receiving customer data indicating the packet flow rule, the customer data corresponding to a selection by the customer of the network boundary from a set of network boundaries, wherein the set of network boundaries corresponds to at least a layer 2 (L2) virtual local area network (VLAN) within the virtual network, a layer 3 (L3) subnet within the virtual network, the virtual network, a private network of the customer peered with the virtual network, another virtual network peered with the virtual network, and a public network; and generating the packet flow rule based on the customer data.

17. One or more non-transitory computer-readable media storing instructions that, upon execution on a first network virtualization device, cause the first network virtualization device to perform operations comprising:

receiving, from a second network virtualization device, a first packet that is generated by a first compute instance of a virtual network associated with a customer and that includes first data, wherein the first data is included in the first packet based on a packet flow rule associated with the first compute instance and indicates that the first packet is permitted to flow within a network boundary, the network boundary defining a set of one or more networks such that a second packet having a destination within the network boundary can flow and such that a third packet having a destination outside of the network boundary is to be dropped;

determining, based on the first data, that the first packet is permitted to flow within the network boundary; and sending the first packet to a third network virtualization device or a host machine within the network boundary, wherein the host machine executes a second compute instance that is a destination of the first packet.

18. The one or more non-transitory computer-readable media of claim 17, wherein the operations further comprise:

receiving a fourth packet generated by the second compute instance;

determining, based on second data included in the fourth packet, that the fourth packet is permitted to flow within a second network boundary, wherein the second data is included in the fourth packet based on a second packet flow rule associated with the second compute instance, and wherein the second network boundary is the same as or different from the network boundary;

enforcing the second network boundary by at least determining that the second network virtualization device is within the second network boundary, and sending the fourth packet to the second network virtualization device.

19. The one or more non-transitory computer-readable media of claim 17, wherein the operations further comprise:

receiving, from the second network virtualization device, a fourth packet that is generated by the first compute instance and that includes second data, wherein the second data is included in the fourth packet based on the packet flow rule and indicates that the fourth packet is permitted to flow within the network boundary; and enforcing the second network boundary by at least determining that a flow of the fourth packet includes a portion that is outside of the network boundary, and dropping, based on the second data, the fourth packet.

20. The one or more non-transitory computer-readable media of claim 17, wherein the operations further comprise:

receiving a fourth packet generated by the second compute instance;

determining, based on a second packet flow rule associated with the second compute instance, a second network boundary within which packets of the second compute instance can flow;

determining that a flow of the fourth packet is within the second network boundary;

generating second data indicating that the flow of the fourth packet is permitted within the second network boundary;

including the second data in the fourth packet; and sending, to the second network virtualization device and based on the second network virtualization device being within the second network boundary, the fourth packet that includes the second data.

* * * * *